US008357033B2

(12) United States Patent
Williams et al.

(10) Patent No.: US 8,357,033 B2
(45) Date of Patent: Jan. 22, 2013

(54) REALISTIC VIDEO REELS

(75) Inventors: David C. Williams, Carson City, NV (US); Joseph R. Hedrick, Reno, NV (US); Kurt Larsen, Reno, NV (US)

(73) Assignee: IGT, Reno, NV (US)

( * ) Notice: Subject to any disclaimer, the term of this patent is extended or adjusted under 35 U.S.C. 154(b) by 493 days.

(21) Appl. No.: 11/858,695

(22) Filed: Sep. 20, 2007

(65) Prior Publication Data

US 2008/0113746 A1 May 15, 2008

Related U.S. Application Data

(60) Provisional application No. 60/858,741, filed on Nov. 13, 2006.

(51) Int. Cl.
*A63F 13/00* (2006.01)

(52) U.S. Cl. .......................................................... 463/20

(58) Field of Classification Search ..................... 463/20
See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,607,844 | A | 8/1986 | Fullerton |
| 4,621,814 | A | 11/1986 | Stepan et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,152,529 | A | 10/1992 | Okada |
| 5,319,491 | A | 6/1994 | Selbrede |
| 5,342,047 | A | 8/1994 | Heidel et al. |
| 5,364,100 | A | 11/1994 | Ludlow et al. |
| 5,375,830 | A | 12/1994 | Takemoto et al. |
| 5,376,587 | A | 12/1994 | Buchmann et al. |
| 5,393,057 | A | 2/1995 | Marnell |
| 5,393,061 | A | 2/1995 | Manship et al. |
| 5,395,111 | A | 3/1995 | Inoue |
| 5,467,893 | A | 11/1995 | Landis, II et al. |
| 5,539,547 | A | 7/1996 | Ishii et al. |
| 5,580,055 | A | 12/1996 | Hagiwara |
| 5,585,821 | A | 12/1996 | Ishikura et al. |

(Continued)

FOREIGN PATENT DOCUMENTS

| | | |
|---|---|---|
| AU | 721968 | 7/2000 |
| AU | 2000 PQ9586 | 8/2000 |

(Continued)

OTHER PUBLICATIONS

International Search Report, 5 page document, International Application No. PCT/US2005/000950, Dated Jun. 2, 2005.

(Continued)

*Primary Examiner* — Dmitry Suhol
*Assistant Examiner* — Malina K Rustemeyer
(74) *Attorney, Agent, or Firm* — Weaver Austin Villeneuve & Sampson LLP

(57) ABSTRACT

Described herein is a gaming machine configured to output video data that simulates mechanical reels in a traditional mechanical slot machine. Embodiments detailed herein contribute to the emulation and perception of a mechanical machine by providing video data adaptations that each simulate a realistic visual attribute of a mechanical reel gaming machine.

25 Claims, 12 Drawing Sheets

U.S. PATENT DOCUMENTS

| | | | | |
|---|---|---|---|---|
| 5,589,980 | A | 12/1996 | Bass et al. | |
| 5,647,798 | A | 7/1997 | Faiciglia | |
| 5,725,428 | A | 3/1998 | Achmueller | |
| 5,745,197 | A | 4/1998 | Leung et al. | |
| 5,752,881 | A | 5/1998 | Inoue | |
| 5,762,552 | A | 6/1998 | Vuong et al. | |
| 5,764,317 | A | 6/1998 | Sadnovik et al. | |
| 5,785,315 | A | 7/1998 | Eiteneer et al. | |
| 5,788,573 | A | 8/1998 | Baerlocher et al. | |
| 5,833,537 | A | 11/1998 | Barrie | |
| 5,851,148 | A | 12/1998 | Brune et al. | |
| 5,910,046 | A | 6/1999 | Wada et al. | |
| 5,923,307 | A | 7/1999 | Hogle, IV | |
| 5,951,397 | A | 9/1999 | Dickinson | |
| 5,956,180 | A | 9/1999 | Bass et al. | |
| 5,967,893 | A | 10/1999 | Lawrence et al. | |
| 5,988,638 | A | 11/1999 | Rodesch et al. | |
| 5,993,027 | A | 11/1999 | Yamamoto et al. | |
| 6,001,016 | A | 12/1999 | Walker et al. | |
| 6,015,346 | A | 1/2000 | Bennett | |
| 6,027,115 | A * | 2/2000 | Griswold et al. | 273/143 R |
| 6,050,895 | A | 4/2000 | Luciano et al. | |
| 6,054,969 | A | 4/2000 | Haisma | |
| 6,057,814 | A | 5/2000 | Kalt | |
| 6,059,289 | A | 5/2000 | Vancura | |
| 6,059,658 | A | 5/2000 | Mangano et al. | |
| 6,068,552 | A | 5/2000 | Walker | |
| 6,086,066 | A | 7/2000 | Takeuchi et al. | |
| 6,093,102 | A | 7/2000 | Bennett | |
| 6,135,884 | A | 10/2000 | Hedrick et al. | |
| 6,159,095 | A | 12/2000 | Frohm et al. | |
| 6,159,098 | A | 12/2000 | Slomiany et al. | |
| 6,168,520 | B1 | 1/2001 | Baerlocher et al. | |
| 6,190,255 | B1 | 2/2001 | Thomas et al. | |
| 6,213,875 | B1 | 4/2001 | Suzuki | |
| 6,227,971 | B1 | 5/2001 | Weiss | |
| 6,234,897 | B1 | 5/2001 | Frohm et al. | |
| 6,244,596 | B1 | 6/2001 | Kondratjuk | |
| 6,251,013 | B1 | 6/2001 | Bennett | |
| 6,251,014 | B1 | 6/2001 | Stockdale et al. | |
| 6,252,707 | B1 | 6/2001 | Kleinberger et al. | |
| 6,254,481 | B1 | 7/2001 | Jaffe | |
| 6,261,178 | B1 | 7/2001 | Bennett | |
| 6,270,411 | B1 | 8/2001 | Gura et al. | |
| 6,297,785 | B1 | 10/2001 | Sommer et al. | |
| 6,315,666 | B1 | 11/2001 | Mastera et al. | |
| 6,322,445 | B1 | 11/2001 | Miller | |
| 6,337,513 | B1 | 1/2002 | Clevenger et al. | |
| 6,347,996 | B1 | 2/2002 | Gilmore et al. | |
| 6,368,216 | B1 | 4/2002 | Hedrick et al. | |
| 6,379,244 | B1 | 4/2002 | Sagawa et al. | |
| 6,398,220 | B1 | 6/2002 | Inoue | |
| 6,398,644 | B1 | 6/2002 | Perrie et al. | |
| 6,404,436 | B1 | 6/2002 | Goden | |
| 6,416,827 | B1 | 7/2002 | Chakrapani et al. | |
| 6,444,496 | B1 | 9/2002 | Edwards et al. | |
| 6,445,185 | B1 | 9/2002 | Damadian et al. | |
| 6,491,583 | B1 | 12/2002 | Gauselmann | |
| 6,503,147 | B1 | 1/2003 | Stockdale et al. | |
| 6,511,375 | B1 | 1/2003 | Kaminkow | |
| 6,512,559 | B1 | 1/2003 | Hashimoto et al. | |
| 6,514,141 | B1 | 2/2003 | Kaminkow et al. | |
| 6,517,433 | B2 | 2/2003 | Loose et al. | |
| 6,517,437 | B1 | 2/2003 | Wells et al. | |
| 6,520,856 | B1 | 2/2003 | Walker et al. | |
| 6,532,146 | B1 | 3/2003 | Duquette | |
| 6,547,664 | B2 | 4/2003 | Saunders | |
| 6,575,541 | B1 | 6/2003 | Hedrick et al. | |
| 6,585,591 | B1 | 7/2003 | Baerlocher et al. | |
| 6,612,927 | B1 | 9/2003 | Slomiany | |
| D480,961 | S | 10/2003 | Deadman | |
| 6,643,124 | B1 | 11/2003 | Wilk | |
| 6,644,664 | B2 | 11/2003 | Muir et al. | |
| 6,646,695 | B1 | 11/2003 | Gauselmann | |
| 6,652,378 | B2 | 11/2003 | Cannon et al. | |
| 6,659,864 | B2 | 12/2003 | McGahn et al. | |
| 6,661,425 | B1 | 12/2003 | Hiroaki | |
| 6,695,696 | B1 | 2/2004 | Kaminkow | |
| 6,695,703 | B1 | 2/2004 | McGahn | |
| 6,702,675 | B2 | 3/2004 | Poole et al. | |
| 6,712,694 | B1 | 3/2004 | Nordman | |
| 6,715,756 | B2 | 4/2004 | Inoue | |
| 6,717,728 | B2 | 4/2004 | Putilin | |
| 6,722,979 | B2 | 4/2004 | Gilmore et al. | |
| 6,802,777 | B2 | 10/2004 | Seelig et al. | |
| 6,817,945 | B2 | 11/2004 | Seelig et al. | |
| 6,817,946 | B2 | 11/2004 | Motegi et al. | |
| 6,859,219 | B1 | 2/2005 | Sall | |
| 6,887,157 | B2 | 5/2005 | LeMay et al. | |
| 6,890,259 | B2 | 5/2005 | Breckner et al. | |
| 6,906,762 | B1 | 6/2005 | Witehira et al. | |
| 6,908,381 | B2 | 6/2005 | Ellis | |
| 6,923,441 | B2 | 8/2005 | Inoue | |
| 6,937,298 | B2 | 8/2005 | Okada | |
| 6,981,635 | B1 | 1/2006 | Hughs-Baird et al. | |
| 7,040,987 | B2 | 5/2006 | Walker et al. | |
| 7,056,215 | B1 | 6/2006 | Olive | |
| 7,095,180 | B2 | 8/2006 | Emslie et al. | |
| 7,095,450 | B1 | 8/2006 | Holmes et al. | |
| 7,097,560 | B2 | 8/2006 | Okada | |
| 7,108,603 | B2 | 9/2006 | Olive | |
| 7,115,033 | B1 | 10/2006 | Timperley | |
| 7,128,647 | B2 | 10/2006 | Muir | |
| 7,159,865 | B2 | 1/2007 | Okada | |
| 7,160,187 | B2 | 1/2007 | Loose et al. | |
| 7,166,029 | B2 | 1/2007 | Enzminger | |
| 7,204,753 | B2 | 4/2007 | Ozaki et al. | |
| 7,207,883 | B2 | 4/2007 | Nozaki et al. | |
| 7,220,181 | B2 | 5/2007 | Okada | |
| 7,227,510 | B2 | 6/2007 | Mayer, III et al. | |
| 7,237,202 | B2 | 6/2007 | Gage | |
| 7,252,288 | B2 | 8/2007 | Seelig et al. | |
| 7,252,591 | B2 | 8/2007 | Van Asdale | |
| 7,255,643 | B2 | 8/2007 | Ozaki et al. | |
| 7,274,413 | B1 | 9/2007 | Sullivan et al. | |
| 7,285,049 | B1 | 10/2007 | Luciano, Jr. et al. | |
| 7,309,284 | B2 | 12/2007 | Griswold et al. | |
| 7,322,884 | B2 | 1/2008 | Emori et al. | |
| 7,324,094 | B2 | 1/2008 | Moilanen et al. | |
| 7,329,181 | B2 | 2/2008 | Hoshino et al. | |
| 7,352,424 | B2 | 4/2008 | Searle | |
| 7,439,683 | B2 | 10/2008 | Emslie | |
| 7,473,173 | B2 | 1/2009 | Peterson et al. | |
| 7,505,049 | B2 | 3/2009 | Engel | |
| 7,510,475 | B2 * | 3/2009 | Loose et al. | 463/31 |
| 7,558,057 | B1 | 7/2009 | Naksen et al. | |
| 7,559,837 | B1 | 7/2009 | Yoseloff et al. | |
| 7,582,016 | B2 | 9/2009 | Suzuki | |
| 7,619,585 | B2 | 11/2009 | Bell et al. | |
| 7,624,339 | B1 | 11/2009 | Engel et al. | |
| 7,626,594 | B1 | 12/2009 | Witehira et al. | |
| 7,724,208 | B1 | 5/2010 | Engel et al. | |
| 7,730,413 | B1 | 6/2010 | Engel | |
| 7,742,124 | B2 | 6/2010 | Bell | |
| 7,742,239 | B2 | 6/2010 | Bell | |
| 7,841,944 | B2 | 11/2010 | Wells | |
| 7,951,001 | B2 | 5/2011 | Wells | |
| 8,012,010 | B2 | 9/2011 | Wilson et al. | |
| 8,115,700 | B2 | 2/2012 | Schlottmann et al. | |
| 8,118,670 | B2 | 2/2012 | Griswold et al. | |
| 8,142,273 | B2 | 3/2012 | Williams et al. | |
| 8,192,281 | B2 | 6/2012 | Williams et al. | |
| 8,199,068 | B2 | 6/2012 | Williams et al. | |
| 8,210,922 | B2 | 7/2012 | Williams et al. | |
| 2001/0013681 | A1 | 8/2001 | Bruzzese et al. | |
| 2001/0016513 | A1 | 8/2001 | Muir et al. | |
| 2001/0031658 | A1 | 10/2001 | Ozaki et al. | |
| 2001/0035868 | A1 | 11/2001 | Uehara et al. | |
| 2002/0004421 | A1 | 1/2002 | Itai | |
| 2002/0022518 | A1 | 2/2002 | Okuda et al. | |
| 2002/0045472 | A1 | 4/2002 | Adams | |
| 2002/0086725 | A1 | 7/2002 | Fasbender et al. | |
| 2002/0119035 | A1 | 8/2002 | Hamilton | |
| 2002/0142825 | A1 | 10/2002 | Lark et al. | |
| 2002/0167637 | A1 | 11/2002 | Burke et al. | |
| 2002/0173354 | A1 | 11/2002 | Winans et al. | |
| 2002/0175466 | A1 | 11/2002 | Loose et al. | |

| | | | |
|---|---|---|---|
| 2002/0183105 | A1 | 12/2002 | Cannon |
| 2002/0183109 | A1 | 12/2002 | McGahn et al. |
| 2003/0026171 | A1 | 2/2003 | Brewer et al. |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0045345 | A1 | 3/2003 | Berman |
| 2003/0060271 | A1 | 3/2003 | Gilmore et al. |
| 2003/0064781 | A1 | 4/2003 | Muir |
| 2003/0069063 | A1 | 4/2003 | Bilyeu et al. |
| 2003/0087690 | A1 | 5/2003 | Loose et al. |
| 2003/0128427 | A1 | 7/2003 | Kalmanash et al. |
| 2003/0130026 | A1 | 7/2003 | Breckner et al. |
| 2003/0130028 | A1 | 7/2003 | Aida et al. |
| 2003/0148804 | A1 | 8/2003 | Ikeya et al. |
| 2003/0157980 | A1* | 8/2003 | Loose et al. .................... 463/20 |
| 2003/0176214 | A1 | 9/2003 | Burak et al. |
| 2003/0199295 | A1 | 10/2003 | Vancura |
| 2003/0220134 | A1 | 11/2003 | Walker et al. |
| 2003/0234489 | A1 | 12/2003 | Okada |
| 2003/0236114 | A1 | 12/2003 | Griswold et al. |
| 2003/0236118 | A1 | 12/2003 | Okada |
| 2004/0002372 | A1 | 1/2004 | Rodgers et al. |
| 2004/0009803 | A1 | 1/2004 | Bennett et al. |
| 2004/0023714 | A1 | 2/2004 | Asdale |
| 2004/0029636 | A1 | 2/2004 | Wells |
| 2004/0036218 | A1 | 2/2004 | Inoue |
| 2004/0048645 | A1 | 3/2004 | Webb et al. |
| 2004/0048673 | A1 | 3/2004 | Kaminkow |
| 2004/0053660 | A1 | 3/2004 | Webb et al. |
| 2004/0063490 | A1 | 4/2004 | Okada |
| 2004/0066475 | A1 | 4/2004 | Searle |
| 2004/0077404 | A1 | 4/2004 | Schlottmann et al. |
| 2004/0102244 | A1 | 5/2004 | Kryuchkov et al. |
| 2004/0102245 | A1 | 5/2004 | Escalera et al. |
| 2004/0116178 | A1 | 6/2004 | Okada |
| 2004/0142748 | A1 | 7/2004 | Loose et al. |
| 2004/0147303 | A1 | 7/2004 | Imura et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0166927 | A1 | 8/2004 | Okada |
| 2004/0171423 | A1 | 9/2004 | Silva et al. |
| 2004/0183251 | A1 | 9/2004 | Inoue |
| 2004/0183972 | A1 | 9/2004 | Bell |
| 2004/0192430 | A1 | 9/2004 | Burak et al. |
| 2004/0198485 | A1 | 10/2004 | Loose |
| 2004/0207154 | A1 | 10/2004 | Okada |
| 2004/0209666 | A1 | 10/2004 | Tashiro |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209672 | A1 | 10/2004 | Okada |
| 2004/0209678 | A1 | 10/2004 | Okada |
| 2004/0209683 | A1 | 10/2004 | Okada |
| 2004/0214635 | A1 | 10/2004 | Okada |
| 2004/0214637 | A1 | 10/2004 | Nonaka |
| 2004/0219967 | A1 | 11/2004 | Giobbi et al. |
| 2004/0224747 | A1 | 11/2004 | Okada |
| 2004/0227721 | A1 | 11/2004 | Moilanen et al. |
| 2004/0233663 | A1 | 11/2004 | Emslie et al. |
| 2004/0235558 | A1 | 11/2004 | Beaulieu et al. |
| 2004/0239582 | A1 | 12/2004 | Seymour |
| 2004/0266515 | A1 | 12/2004 | Gauselmann |
| 2004/0266536 | A1 | 12/2004 | Mattice et al. |
| 2005/0020348 | A1 | 1/2005 | Thomas et al. |
| 2005/0026673 | A1 | 2/2005 | Paulsen et al. |
| 2005/0032571 | A1 | 2/2005 | Asonuma |
| 2005/0037843 | A1 | 2/2005 | Wells et al. |
| 2005/0049032 | A1 | 3/2005 | Kobayashi |
| 2005/0049033 | A1 | 3/2005 | Kojima |
| 2005/0049046 | A1 | 3/2005 | Kobayashi |
| 2005/0052341 | A1 | 3/2005 | Henriksson |
| 2005/0062410 | A1 | 3/2005 | Bell et al. |
| 2005/0063055 | A1 | 3/2005 | Engel |
| 2005/0079913 | A1 | 4/2005 | Inamura |
| 2005/0085292 | A1 | 4/2005 | Inamura |
| 2005/0145366 | A1 | 7/2005 | Erel |
| 2005/0153772 | A1 | 7/2005 | Griswold et al. |
| 2005/0153775 | A1 | 7/2005 | Griswold et al. |
| 2005/0164786 | A1 | 7/2005 | Connelly |
| 2005/0176493 | A1 | 8/2005 | Nozaki et al. |
| 2005/0192090 | A1 | 9/2005 | Muir et al. |
| 2005/0206582 | A1 | 9/2005 | Bell et al. |
| 2005/0208994 | A1 | 9/2005 | Berman |
| 2005/0233799 | A1 | 10/2005 | LeMay et al. |
| 2005/0239539 | A1 | 10/2005 | Inamura |
| 2005/0253775 | A1 | 11/2005 | Stewart |
| 2005/0255908 | A1 | 11/2005 | Wells et al. |
| 2005/0266912 | A1 | 12/2005 | Sekiguchi |
| 2005/0285337 | A1 | 12/2005 | Durham et al. |
| 2006/0025199 | A1 | 2/2006 | Harkins et al. |
| 2006/0058100 | A1* | 3/2006 | Pacey et al. ..................... 463/31 |
| 2006/0063580 | A1 | 3/2006 | Nguyen et al. |
| 2006/0073881 | A1 | 4/2006 | Pryzby |
| 2006/0100014 | A1 | 5/2006 | Griswold et al. |
| 2006/0103951 | A1 | 5/2006 | Bell et al. |
| 2006/0111179 | A1 | 5/2006 | Inamura |
| 2006/0125745 | A1 | 6/2006 | Evanicky |
| 2006/0166727 | A1 | 7/2006 | Burak |
| 2006/0191177 | A1 | 8/2006 | Engel |
| 2006/0256033 | A1 | 11/2006 | Chan et al. |
| 2006/0284574 | A1 | 12/2006 | Emslie et al. |
| 2006/0290594 | A1 | 12/2006 | Engel et al. |
| 2007/0004510 | A1 | 1/2007 | Underdahl et al. |
| 2007/0004513 | A1 | 1/2007 | Wells et al. |
| 2007/0010315 | A1 | 1/2007 | Hein |
| 2007/0057866 | A1 | 3/2007 | Lee et al. |
| 2007/0072665 | A1 | 3/2007 | Muir |
| 2007/0077986 | A1 | 4/2007 | Loose et al. |
| 2007/0091011 | A1 | 4/2007 | Selbrede |
| 2007/0105610 | A1 | 5/2007 | Anderson |
| 2007/0105611 | A1 | 5/2007 | O'Halloran |
| 2007/0105628 | A1 | 5/2007 | Arbogast et al. |
| 2007/0167208 | A1 | 7/2007 | Acres |
| 2007/0252804 | A1 | 11/2007 | Engel |
| 2008/0004104 | A1* | 1/2008 | Durham et al. ................. 463/20 |
| 2008/0007486 | A1 | 1/2008 | Fujinawa et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0064497 | A1 | 3/2008 | Griswold et al. |
| 2008/0068290 | A1 | 3/2008 | Muklashy et al. |
| 2008/0096655 | A1 | 4/2008 | Rasmussen et al. |
| 2008/0108422 | A1 | 5/2008 | Hedrick et al. |
| 2008/0113716 | A1 | 5/2008 | Beadell et al. |
| 2008/0113745 | A1 | 5/2008 | Williams et al. |
| 2008/0113747 | A1 | 5/2008 | Williams et al. |
| 2008/0113748 | A1 | 5/2008 | Williams et al. |
| 2008/0113749 | A1 | 5/2008 | Williams et al. |
| 2008/0113756 | A1 | 5/2008 | Williams et al. |
| 2008/0113775 | A1 | 5/2008 | Williams et al. |
| 2008/0125219 | A1 | 5/2008 | Williams et al. |
| 2008/0136741 | A1 | 6/2008 | Williams et al. |
| 2008/0261674 | A9 | 10/2008 | Okada |
| 2008/0284792 | A1 | 11/2008 | Bell et al. |
| 2009/0036208 | A1 | 2/2009 | Pennington et al. |
| 2009/0061983 | A1 | 3/2009 | Kaufman et al. |
| 2009/0061984 | A1 | 3/2009 | Yi et al. |
| 2009/0069069 | A1 | 3/2009 | Crowder, Jr. et al. |
| 2009/0069070 | A1 | 3/2009 | Crowder, Jr. et al. |
| 2009/0079667 | A1 | 3/2009 | Schlottmann et al. |
| 2009/0082083 | A1 | 3/2009 | Wilson et al. |
| 2009/0091513 | A1 | 4/2009 | Kuhn |
| 2009/0104989 | A1 | 4/2009 | Williams et al. |
| 2009/0111577 | A1 | 4/2009 | Mead |
| 2009/0117993 | A1 | 5/2009 | Bigelow, Jr. et al. |
| 2009/0258697 | A1 | 10/2009 | Kelly et al. |
| 2009/0258701 | A1 | 10/2009 | Crowder, Jr. et al. |
| 2009/0280888 | A1 | 11/2009 | Durham et al. |
| 2009/0312095 | A1 | 12/2009 | Durham et al. |
| 2010/0045601 | A1 | 2/2010 | Engel et al. |
| 2010/0048288 | A1 | 2/2010 | Canterbury et al. |
| 2010/0115391 | A1 | 5/2010 | Engel et al. |
| 2010/0115439 | A1 | 5/2010 | Engel |
| 2010/0190545 | A1 | 7/2010 | Lauzon et al. |
| 2010/0214195 | A1 | 8/2010 | Ogasawara et al. |

| | | | |
|---|---|---|---|
| 2010/0234089 A1 | 9/2010 | Saffari et al. |
| 2011/0065490 A1 | 3/2011 | Lutnick et al. |
| 2011/0201404 A1 | 8/2011 | Wells |
| 2011/0294562 A1 | 12/2011 | Wilson et al. |
| 2012/0034975 A1 | 2/2012 | Silva et al. |

FOREIGN PATENT DOCUMENTS

| | | |
|---|---|---|
| CA | 2265283 | 9/1999 |
| CA | 2428858 | 5/2002 |
| CN | 1137651 | 12/1996 |
| CN | 1208210 | 2/1999 |
| EP | 0 454 423 | 10/1991 |
| EP | 0 484 103 | 5/1992 |
| EP | 0 860 807 | 8/1998 |
| EP | 0 919 965 | 6/1999 |
| EP | 0 997 857 | 10/1999 |
| EP | 1 000 642 | 5/2000 |
| EP | 1 260 928 | 11/2002 |
| EP | 1 282 088 | 2/2003 |
| EP | 1 369 830 | 12/2003 |
| EP | 1 391 847 | 2/2004 |
| EP | 1 462 152 A2 | 9/2004 |
| EP | 1 465 126 | 10/2004 |
| EP | 1 492 063 | 12/2004 |
| EP | 1 571 626 | 9/2005 |
| EP | 1 762 992 | 3/2007 |
| EP | 1 826 739 | 8/2007 |
| GB | 1 464 896 | 2/1977 |
| GB | 2 120 506 | 11/1983 |
| GB | 2 253 300 | 9/1992 |
| GB | 2 316 214 | 2/1998 |
| GB | 2 385 004 | 8/2003 |
| JP | H02-90884 | 7/1990 |
| JP | H03-20388 | 2/1991 |
| JP | 04-220276 | 8/1992 |
| JP | H05-68585 | 9/1993 |
| JP | 06-043425 | 2/1994 |
| JP | 07-124290 | 5/1995 |
| JP | H10-015247 | 1/1998 |
| JP | 10-234932 | 9/1998 |
| JP | 11-000441 | 1/1999 |
| JP | H11-137852 | 5/1999 |
| JP | 2000-245963 | 9/2000 |
| JP | 2000-300729 | 10/2000 |
| JP | 00-350805 | 12/2000 |
| JP | 2000-354685 | 12/2000 |
| JP | 01-062032 | 3/2001 |
| JP | 01-238995 | 9/2001 |
| JP | 01-252393 | 9/2001 |
| JP | 01-252394 | 9/2001 |
| JP | 2001-353254 | 12/2001 |
| JP | 02-085624 | 3/2002 |
| JP | 2004-089707 | 3/2004 |
| JP | 2004-105616 | 4/2004 |
| JP | 04-166879 | 6/2004 |
| JP | 2004-350869 | 12/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-043425 | 2/2006 |
| JP | 2006-059607 | 3/2006 |
| JP | 2006-346226 | 12/2006 |
| JP | 2007-200869 | 8/2007 |
| RU | 2 053 559 | 1/1996 |
| RU | 2 145 116 | 1/2000 |
| RU | 29794 | 5/2003 |
| WO | WO 93/13446 | 7/1993 |
| WO | 99/42889 | 8/1999 |
| WO | 99/44095 | 9/1999 |
| WO | WO 99/53454 | 10/1999 |
| WO | WO 00/32286 | 6/2000 |
| WO | 01/15127 | 3/2001 |
| WO | 01/15128 | 3/2001 |
| WO | 01/15132 | 3/2001 |
| WO | WO 01/38926 | 5/2001 |
| WO | 01/09664 | 8/2001 |
| WO | WO 02/38234 | 5/2002 |
| WO | WO 02/41046 | 5/2002 |
| WO | WO 02/084637 | 10/2002 |
| WO | WO 02/086610 | 10/2002 |
| WO | WO 02/089102 | 11/2002 |
| WO | WO 03/001486 | 1/2003 |
| WO | WO 03/023491 | 3/2003 |
| WO | WO 03/032058 | 4/2003 |
| WO | 03/039699 | 5/2003 |
| WO | WO 03/040820 | 5/2003 |
| WO | NZ2003/00153 | 7/2003 |
| WO | WO 03/079094 | 9/2003 |
| WO | 2004/001486 | 12/2003 |
| WO | WO 04/001488 | 12/2003 |
| WO | WO 04/002143 | 12/2003 |
| WO | WO 2004/008226 | 1/2004 |
| WO | WO 2004/023825 | 3/2004 |
| WO | WO 2004/025583 | 3/2004 |
| WO | WO 2004/036286 | 4/2004 |
| WO | WO 2004/060512 | 7/2004 |
| WO | WO 2004/079674 | 9/2004 |
| WO | 2004/102520 | 11/2004 |
| WO | WO 2005/071629 | 8/2005 |
| WO | 2006/034192 | 3/2006 |
| WO | 2006/038819 | 4/2006 |
| WO | WO 2006/112740 | 10/2006 |
| WO | WO 2007/040413 | 4/2007 |
| WO | WO 2008/005278 | 1/2008 |
| WO | WO 2008/028153 | 3/2008 |
| WO | WO 2008/048857 | 4/2008 |
| WO | WO 2008/061068 | 5/2008 |
| WO | WO 2008/062914 | 5/2008 |
| WO | WO 2008/063908 | 5/2008 |
| WO | WO 2008/063914 | 5/2008 |
| WO | WO 2008/063952 | 5/2008 |
| WO | WO 2008/063956 | 5/2008 |
| WO | WO 2008/063968 | 5/2008 |
| WO | WO 2008/063969 | 5/2008 |
| WO | WO 2008/063971 | 5/2008 |
| WO | WO 2008/079542 | 7/2008 |
| WO | WO 2009/029720 | 3/2009 |
| WO | WO 2009/039245 | 3/2009 |
| WO | WO 2009/039295 | 3/2009 |
| WO | WO 2009/054861 | 4/2009 |
| WO | WO 2010/023537 | 3/2010 |
| WO | WO 2010/039411 | 4/2010 |

OTHER PUBLICATIONS

Written Opinion of the International Searching Authority, 7 page document, International Application No. PCT/US2005/000950, Dated Jun. 2, 2005.

"Light Valve". [online] [retrieved on Nov. 15, 2005]. Retrieved from the Internet URL http://www.meko.co.uk/lightvalve.shtml (1 page).

"Liquid Crystal Display". [online]. [retrieved on Nov. 16, 2005]. Retrieved form the Internet URL http://en.wikipedia.org/wiki/LCD (6 pages).

Bonsor, Kevin, "How Smart Windows Will Work," Howstuffworks, Inc. 1998-2002, http://www/howstuffworks.com/smart-window.htm/printable. Printed Nov. 25, 2002 (5 pages).

"What is SPD?" SPD Systems, Inc. 2002, http://www.spd-systems.com/spdq.htm. Printed Dec. 4, 2002 (2 pages).

"Debut of the Let's Make a Deal Slot Machine," Let's Make a Deal 1999-2002, http:///www.letsmakeadeal.com/pr01.htm. Printed Dec. 3, 2002 (2 pages).

Living in a flat world? Advertisement written by Deep Video Imaging Ltd., published 2000.

Novel 3-D Video Display Technology Developed, News release: Aug. 30, 1996, www.eurekalert.org/summaries/1199.html, printed from Internet Archive using date Sep. 2, 2000.

Time Multiplexed Optical Shutter (TMOS): A revolutionary Flat Screen Display Technology, www.vea.com/TMOS.html, Apr. 8, 1999, printed from Internet Archive using date Oct. 6, 1999.

Time Multiplexed Optical Shutter (TMOS): A revolutionary Flat Screen Display Technology, www.tralas.com/TMOS.html, Apr. 5, 2001, printed from Internet Archive using date Apr. 11, 2001.

Written Opinion of the International Searching Authority dated May 25, 2005, for PCT Application No. PCT/US2005/000597.
Bosner, "How Smart Windows Work," HowStuffWorks, Inc.,www.howstuffworks.com, 1998-2004, 9 pages.
Saxe et al., "Suspended-Particle Devices," www.refr-spd.com, Apr./May 1996, 5 pages.
"SPD," Malvino Inc., www.malvino.com, Jul. 19, 1999, 10 pages.
International Exam Report dated Sep. 21, 2007 in European Application No. 05 705 315.9.
U.S. Appl. No. 11/849,119, filed Aug. 31, 2007.
U.S. Appl. No. 11/858,695, filed Sep. 20, 2007.
U.S. Appl. No. 11/858,845, filed Sep. 20, 2007.
U.S. Appl. No. 11/858,849, filed Sep. 20, 2007.
U.S. Appl. No. 11/859,127, filed Sep. 21, 2007.
U.S. Appl. No. 11/938,184, filed Nov. 9, 2007.
U.S. Appl. No. 11/877,611, filed Oct. 23, 2007.
U.S. Appl. No. 11/938,086, filed Nov. 9, 2007.
U.S. Appl. No. 11/938,151, filed Nov. 9, 2007.
Office Action dated Aug. 29, 2007 from U.S. Appl. No. 10/755,598.
Office Action dated Oct. 31, 2007 from U.S. Appl. No. 10/213,626.
Final Office Action dated Mar. 28, 2007 from U.S. Appl. No. 10/213,626.
Office Action dated Apr. 27, 2006 from U.S. Appl. No. 10/213,626.
Final Office Action dated Jan. 10, 2006 from U.S. Appl. No. 10/213,626.
Office Action dated Aug. 31, 2004 from U.S. Appl. No. 10/213,626.
International Search Report and Written Opinion, mailed on May 14, 2008, PCT/US2007/084429.
U.S. Appl. No. 09/622,409, filed Nov. 6, 2000, Engel.
U.S. Appl. No. 12/849,284, filed Aug. 3, 2010, Silva.
U.S. Appl. No. 13/094,259, filed Apr. 26, 2011, Wells.
U.S. Appl. No. 13/443,770, filed Apr. 10, 2012, Frabbiele et al.
US Office Action dated Mar. 30, 2010 issued in U.S. Appl. No. 11/938,086.
US Office Action Final dated Aug. 19, 2010 issued in U.S. Appl. No. 11/938,086.
US Office Action dated Dec. 3, 2010 issued in U.S. Appl. No. 11/938,086.
US Notice of Allowance dated Apr. 18, 2011 issued in U.S. Appl. No. 11/938,086.
US Notice of Allowance dated Oct. 7, 2011 issued in U.S. Appl. No. 11/938,086.
U.S. Office Action dated Oct. 9, 2009 issued in U.S. Appl. No. 11/514,808.
U.S. Office Action Final dated Apr. 22, 2010 issued in U.S. Appl. No. 11/514,808.
U.S. Office Action and Examiner Interview Summary dated Oct. 18, 2010 issued in U.S. Appl. No. 11/514,808.
U.S. Office Action Final dated Apr. 27, 2011 issued in U.S. Appl. No. 11/514,808.
U.S. Office Action dated Dec. 2, 2009 issued in U.S. Appl. No. 11/829,852.
U.S. Office Action dated Jul. 14, 2010 issued in U.S. Appl. No. 11/829,852.
U.S. Office Action dated Nov. 14, 2008 issued in U.S. Appl. No. 11/829,853.
U.S. Office Action dated Oct. 31, 2008 issued in U.S. Appl. No. 11/829,849.
U.S. Office Action dated Oct. 5, 2011 issued in U.S. Appl. No. 12/245,490.
U.S. Office Action Final dated May 3, 2012 issued in U.S. Appl. No. 12/245,490.
US Office Action Final dated Apr. 23, 2008 issued in U.S. Appl. No. 10/755,598.
US Office Action dated Oct. 8, 2008 issued in U.S. Appl. No. 10/755,598.
US Office Action Final dated Jul. 1, 2009 issued in U.S. Appl. No. 10/755,598.
US Office Action Final dated Jan. 22, 2010 issued in U.S. Appl. No. 10/755,598.
US Office Action Final dated Aug. 4, 2010 issued in U.S. Appl. No. 10/755,598.
US Notice of Panel Decision from Pre-Appeal Brief Review dated Dec. 1, 2010 issued in U.S. Appl. No. 10/755,598.
US Office Action dated Mar. 28, 2011 issued in U.S. Appl. No. 10/755,598.
US Office Action Final dated Nov. 8, 2011 issued in U.S. Appl. No. 10/755,598.
US Office Action dated Oct. 31, 2008 issued in U.S. Appl. No. 11/829,917.
US Office Action Final dated Aug. 11, 2009 issued in U.S. Appl. No. 11/829,917.
US Office Action dated Jan. 29, 2010 issued in U.S. Appl. No. 11/829,917.
US Office Action Final dated Aug. 5, 2010 issued in U.S. Appl. No. 11/829,917.
U.S. Office Action dated Jun. 23, 2009 issued in U.S. Appl. No. 11/938,151.
U.S. Office Action Final dated Feb. 8, 2010 issued in U.S. Appl. No. 11/938,151.
U.S. Advisory Action dated Apr. 22, 2010 issued in U.S. Appl. No. 11/938,151.
U.S. Office Action dated Jul. 23, 2010 issued in U.S. Appl. No. 11/938,151.
U.S. Office Action Final dated Jan. 4, 2011 issued in U.S. Appl. No. 11/938,151.
U.S. Office Action (Notice of Panel Decision from Pre-Appeal Brief Review) dated Apr. 27, 2011 issued in U.S. Appl. No. 11/938,151.
U.S. Notice of Allowance dated Sep. 12, 2011 issued in U.S. Appl. No. 11/938,151.
U.S. Notice of Allowance and Allowability dated Jan. 9, 2012 issued in U.S. Appl. No. 11/938,151.
U.S. Amendment After Allowance-Rule 1.312 dated Jan. 26, 2012 issued in U.S. Appl. No. 11/938,151.
U.S. Office Action dated Jul. 9, 2010 issued in U.S. Appl. No. 11/858,849.
U.S. Office Action Final dated Nov. 30, 2010 issued in U.S. Appl. No. 11/858,849.
U.S. Office Action dated Mar. 22, 2011 issued in U.S. Appl. No. 11/858,849.
U.S. Office Action Final dated Aug. 11, 2011 issued in U.S. Appl. No. 11/858,849.
U.S. Office Action (Advisory Action) dated Dec. 2, 2011 issued in U.S. Appl. No. 11/858,849.
U.S. Notice of Allowance and Allowability dated Dec. 14, 2011 issued in U.S. Appl. No. 11/858,849.
U.S. Office Action dated Jul. 9, 2009 issued in U.S. Appl. No. 11/858,700.
U.S. Office Action Final dated Jan. 4, 2010 issued in U.S. Appl. No. 11/858,700.
U.S. Office Action Final dated Apr. 7, 2010 issued in U.S. Appl. No. 11/858,700.
U.S. Office Action dated Aug. 5, 2010 issued in U.S. Appl. No. 11/858,700.
U.S. Office Action Final dated Dec. 27, 2010 issued in U.S. Appl. No. 11/858,700.
U.S. Office Action dated Nov. 18, 2011 issued in U.S. Appl. No. 11/858,700.
U.S. Office Action dated Apr. 25, 2012 issued in U.S. Appl. No. 11/858,700.
U.S. Office Action dated Apr. 28, 2011 issued in U.S. Appl. No. 11/858,793.
U.S. Notice of Allowance dated Oct. 12, 2011 issued in U.S. Appl. No. 11/858,793.
U.S. Allowed Claims dated Oct. 12, 2011 issued in U.S. Appl. No. 11/858,793.
U.S. Notice of Allowance dated Feb. 1, 2012 issued in U.S. Appl. No. 11/858,793.
U.S. Office Action dated Jul. 9, 2009 issued in U.S. Appl. No. 11/858,693.
U.S. Office Action Final dated Mar. 23, 2010 issued in U.S. Appl. No. 11/858,693.
U.S. Advisory Action dated Jun. 1, 2010 issued in U.S. Appl. No. 11/858,693.

U.S. Office Action dated Aug. 5, 2010 issued in U.S. Appl. No. 11/858,693.
U.S. Office Action Final dated Feb. 7, 2011 issued in U.S. Appl. No. 11/858,693.
U.S. Advisory Action dated Apr. 8, 2011 issued in U.S. Appl. No. 11/858,693.
U.S. Notice of Allowance dated Nov. 21, 2011 issued in U.S. Appl. No. 11/858,693.
U.S. Allowed Claims dated Nov. 21, 2011 issued in U.S. Appl. No. 11/858,693.
U.S. Notice of Allowance dated Feb. 29, 2012 issued in U.S. Appl. No. 11/858,693.
U.S. Office Action dated Jul. 10, 2009 issued in U.S. Appl. No. 11/858,845.
U.S. Office Action Final dated Feb. 5, 2010 issued in U.S. Appl. No. 11/858,845.
U.S. Notice of Panel Decision from Pre-Appeal Brief Review dated Jun. 8, 2010 issued in U.S. Appl. No. 11/858,845.
U.S. Office Action dated May 1, 2012 issued in U.S. Appl. No. 11/858,845.
U.S. Office Action dated Apr. 7, 2011 issued in U.S. Appl. No. 11/849,119.
U.S. Office Action Final dated Sep. 6, 2011 issued in U.S. Appl. No. 11/849,119.
U.S. Office Action dated Nov. 12, 2010 issued in U.S. Appl. No. 11/859,127.
U.S. Notice of Allowance dated May 4, 2011 issued in U.S. Appl. No. 11/859,127.
Third Party Submission for U.S. Appl. No. 13/207,260 dated Jan. 31, 2012.
U.S. Notice of Allowance dated Jun. 1, 2012 issued in U.S. Appl. No. 13/207,260.
U.S. Allowed Claims dated Jun. 1, 2012 issued in U.S. Appl. No. 13/207,260.
U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Jan. 20, 2012 issued in U.S. Appl. No. 11/877,611.
U.S. Office Action dated Jun. 13, 2003 issued in U.S. Appl. No. 09/966,851.
U.S. Office Action dated Mar. 30, 2004 issued in U.S. Appl. No. 09/966,851.
U.S. Office Action Final dated Dec. 14, 2004 issued in U.S. Appl. No. 09/966,851.
U.S. Notice of Allowance dated Jun. 13, 2006 issued in U.S. Appl. No. 09/966,851.
U.S. Office Action dated Sep. 9, 2009 issued in U.S. Appl. No. 11/549,258.
U.S. Office Action Final dated Mar. 26, 2010 issued in U.S. Appl. No. 11/549,258.
U.S. Office Action dated Jul. 9, 2010 issued in U.S. Appl. No. 11/549,258.
U.S. Office Action Final dated Dec. 21, 2010 issued in U.S. Appl. No. 11/549,258.
U.S. Office Action dated Oct. 4, 2011 issued in U.S. Appl. No. 11/549,258.
U.S. Office Action dated Sep. 3, 2010 issued in U.S. Appl. No. 11/938,632.
U.S. Office Action Final dated Dec. 15, 2010 issued in U.S. Appl. No. 11/938,632.
U.S. Advisory Action dated Mar. 16, 2011 issued in U.S. Appl. No. 11/938,632.
U.S. Notice of Allowance dated May 27, 2011 issued in U.S. Appl. No. 11/938,632.
U.S. Notice of Allowance dated Oct. 5, 2011 issued in U.S. Appl. No. 11/938,632.
U.S. Notice of Allowance dated Jan. 25, 2012 issued in U.S. Appl. No. 11/938,632.
U.S. Office Action dated Jun. 23, 2009 issued in U.S. Appl. No. 11/938,184.
U.S. Office Action Final dated Feb. 8, 2010 issued in U.S. Appl. No. 11/938,184.
U.S. Office Action dated Aug. 5, 2010 issued in U.S. Appl. No. 11/938,184.
U.S. Office Action Final dated Jan. 20, 2011 issued in U.S. Appl. No. 11/938,184.
US Office Action dated Nov. 17, 2001 issued in U.S. Appl. No. 10/376,852.
US Office Action dated Apr. 13, 2005 issued in U.S. Appl. No. 10/376,852.
US Office Action Final dated Nov. 18, 2005 issued in U.S. Appl. No. 10/376,852.
US Advisory Action dated Feb. 7, 2006 issued in U.S. Appl. No. 10/376,852.
US Office Action dated Sep. 19, 2006 issued in U.S. Appl. No. 10/376,852.
US Notice of Informal or Non-Responsive Amendment dated Mar. 9, 2007 issued in U.S. Appl. No. 10/376,852.
US Office Action Final dated Jun. 22, 2007 issued in U.S. Appl. No. 10/376,852.
US Office Action dated Jan. 28, 2008 issued in U.S. Appl. No. 10/376,852.
US Office Action Final dated Aug. 6, 2008 issued in U.S. Appl. No. 10/376,852.
US Office Action dated Feb. 2, 2009 issued in U.S. Appl. No. 10/376,852.
US Notice of Allowance dated Nov. 10, 2009 issued in U.S. Appl. No. 10/376,852.
US Office Action dated Mar. 25, 2010 issued in U.S. Appl. No. 10/376,852.
U.S. Office Action dated Mar. 1, 2012 issued in U.S. Appl. No. 12/849,284.
Third Party Submission for U.S. Appl. No. 12/849,284 dated Apr. 9, 2012.
U.S. Office Action Final dated Aug. 29, 2008 issued in U.S. Appl. No. 10/213,626.
U.S. Office Action dated Jul. 9, 2009 issued in U.S. Appl. No. 10/213,626.
U.S. Notice of Allowance and Examiner Interview Summary dated Mar. 1, 2010 issued in U.S. Appl. No. 10/213,626.
U.S. Notice of Allowance dated Jun. 22, 2010 issued in U.S. Appl. No. 10/213,626.
U.S. Notice of Allowance dated Oct. 4, 2010 issued in U.S. Appl. No. 10/213,626.
U.S. Office Action dated May 24, 2007 issued in U.S. Appl. No. 11/167,655.
U.S. Office Action dated Jan. 3, 2008 issued in U.S. Appl. No. 11/167,655.
U.S. Office Action Final dated Mar. 8, 2008 issued in U.S. Appl. No. 11/167,655.
U.S. Office Action Final dated Sep. 2, 2008 issued in U.S. Appl. No. 11/167,655.
U.S. Office Action dated Jul. 17, 2009 issued in U.S. Appl. No. 11/167,655.
U.S. Notice of Allowance dated Mar. 11, 2010 issued in U.S. Appl. No. 11/167,655.
U.S. Notice of Allowance dated Jul. 7, 2010 issued in U.S. Appl. No. 11/167,655.
U.S. Notice of Allowance dated Dec. 10, 2010 issued in U.S. Appl. No. 11/167,655.
U.S. Notice of Allowance dated Apr. 1, 2011 issued in U.S. Appl. No. 11/167,655.
Third Party Submission filed for U.S. Appl. No. 13/094,259 dated Oct. 18, 2011.
PCT International Search Report dated Apr. 9, 2008 issued in WO 2008/028153.
PCT Written Opinion dated Apr. 9, 2008 issued in WO 2008/028153.
PCT International Preliminary Report on Patentability and Written Opinion dated Mar. 3, 2009 issued in WO 2008/028153.
Australian Examiner's first report dated Jul. 25, 2011 issued in AU 2007289050.
European Examination Report dated Oct. 5, 2009 issued in EP 07 814 629.7.

PCT International Search Report dated Dec. 7, 2009 issued in WO 2010/039411.
PCT International Search Report dated May 25, 2005 issued in WO 2005/071629.
PCT International Preliminary Report on Patentability and Written Opinion dated Jul. 17, 2006 issued in WO 2005/071629.
Australian Examiner's First Report dated Nov. 12, 2009 issued in AU2005207309.
Australian Examiner's Report No. 2 dated Sep. 15, 2010 issued in AU Application No. 2005207309.
Chinese First Office Action dated Nov. 28, 2008 issued in CN2005800022940.
Chinese Second Office Action dated Sep. 25, 2009 issued in CN2005800022940.
Chinese Third Office Action dated May 11, 2010 issued in CN2005800022940.
EP Examination Report dated Sep. 13, 2007 issued in EP 05 705 315.9.
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
Australian Examiner's first report dated Jul. 7, 2011 issued in AU 2007319331.
EP Examination Report dated Oct. 28, 2009 issued in EP 07 845 059.0 1238.
PCT International Search Report dated May 20, 2008 issued in WO 2008/063952.
PCT International Search Report and Written Opinion dated May 20, 2008 issued in WO 2008/063952.
PCT International Preliminary Report on Patentability and Written Opinion dated May 19, 2009 issued in WO 2008/063952.
Australian Examiner's first report dated Aug. 2, 2011 issued in AU 2007323945.
Australian Examiner's report No. 2 dated Feb. 10, 2012 issued in AU 2007323945.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.
Australian Examiner's first report dated Jul. 25, 2011 issued in AU 2007324000.
European Examination Report dated Oct. 28, 2009 issued in EP 07 844 998.0.
PCT International Preliminary Report on Patentability and Written Opinion dated May 19, 2009 issued in WO 2008/063956.
Australian Examiner's First Report dated Aug. 4, 2011 issued in AU 2007323949.
Australian Patent Examination Report No. 2 dated Jun. 27, 2012 issued in AU 2007323949.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19, 2009 issued in WO 2008/063908.
Australian Examiner's first report dated Jul. 25, 2011 issued in AU 2007323994.
PCT International Search Report dated Jun. 11, 2008 issued in WO 2008/079542.
PCT Written Opinion dated Jun. 11, 2008 issued in WO 2008/079542.
PCT International Preliminary Report on Patentability and Written Opinion dated May 19, 2009 issued in WO 2008/079542.
Australian Examiner's first report dated Aug. 2, 2011 issued in AU 2007338512.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.
Australian Examiner's first report dated Aug. 2, 2011 issued in AU 2007323964.
European Examination Report dated Oct. 28, 2009 issued in EP 07 845 062.4.
PCT International Search Report dated Dec. 11, 2008 issued in WO 2009/039295.
PCT Written Opinion dated Dec. 11, 2008 issued in WO 2009/039295.
PCT International Preliminary Report on Patentability and Written Opinion dated Mar. 24, 2010 issued in WO 2009/039295.
PCT International Search Report dated Jul. 16, 2008 issued in WO2009/054861.
PCT Written Opinion dated Jul. 16, 2008 issued in WO2009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
Australian Examiner's first report dated Nov. 30, 2011 issued in AU2007312986.
European Examination Report dated Sep. 10, 2009 issued in EP 07 853 965.7.
PCT International Search Report dated May 20, 2008 issued in WO2008/063969.
PCT Written Opinion dated May 20, 2008 issued in WO 2008/063969.
PCT International Preliminary Report on Patentability and Written Opinion dated May 19, 2009 issued in WO 2008/063969.
Australian Examiner's first report dated Aug. 19, 2011 issued in AU2007323962.
Australian Examiner's report No. 2 dated Feb. 24, issued in AU2007323962.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.
Australian Examiner's first report dated Jul. 29, 2011 issued in AU 2007323961.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.

Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
European Extended Search Report dated Jan. 26, 2012 issued in EP 11 17 6202.
European Communication dated Mar. 5, 2012 issued in EP 11 17 6202.
GB Combined Search and Examination Report dated Nov. 18, 2011 issued in GB1113207.3.
Australian Examiner's First Report dated Apr. 5, 2005 issued in AU2003227286.
Australian Examination Report (as described by Applicant's Attorney) dated Feb. 26, 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
Newton, Harry, Newton's Telecom Dictionary, Jan. 1998, Telecom Books and Flatiron Publishing, p. 399.
"Pointer_Ballistics for Windows XP.pdf" (Oct. 31, 2002), *Microsoft*, [downloaded on Aug. 27, 2010 from http://www.microsoft.com/whdc/archive/pointer-bal.mspx], 3 pages.
Police 911, *Wikipedia*, Jan. 22, 2002, retrieved from Internet at http://en.wilkipedia.org/widi/Police_911 on Oct. 28, 2007, 4 pages.
Stic Search History, Patent Literature Bibliographic Databases, Cited by Examiner in a US Office Action dated Jul. 23, 2010 issued in U.S. Appl. No. 11/938,151, 98 pages.

* cited by examiner

REALISTIC VIDEO REELS

CROSS REFERENCE TO RELATED APPLICATIONS

This application claims priority under 35 U.S.C. §119(e) to U.S. Provisional Patent Application No. 60/858,741 filed on Nov. 13, 2006, which is incorporated herein by reference in its entirety for all purposes.

FIELD OF THE INVENTION

This invention relates to gaming machines. In particular, embodiments described herein relate to video data, for output on a gaming machine, that simulates a realistic visual attributes of a mechanically driven reel slot machine.

BACKGROUND

As technology in the gaming industry progresses, the traditional mechanically driven reel slot machines are being replaced by electronic machines having an LCD video display or the like. Processor-based gaming machines are becoming the norm. One reason for their increased popularity is the nearly endless variety of games that can be implemented using processor-based technology. The processor-based gaming machines permit the operation of more complex games, incorporate player tracking, improve security, permit wireless communications, and add a host of digital features that are not possible on mechanical-driven gaming machines. The increasing cost of designing, manufacturing, and maintaining complex mechanical gaming machines has also motivated casinos and the gaming industry to abandon these older machines.

SUMMARY

The present invention provides a gaming machine configured to output video data that simulates mechanical reels in a traditional mechanical slot machine. Embodiments detailed herein contribute to the emulation and perception of a mechanical machine by providing video data adaptations that each simulate a realistic visual attribute of a mechanical reel gaming machine.

In one aspect, the present invention relates to a gaming machine. The gaming machine includes a first video display device, a second video display device, and a cabinet defining an interior region of the gaming machine. The cabinet is adapted to house a plurality of gaming machine components within or about the interior region. The first video display device is disposed within or about the interior region, is configured to output a visual image in response to a control signal, and includes one or more controllably transparent portions. The second video display device is arranged relative to the first video display device such that a common line of sight passes through a portion of the first video display device to a portion of the second video display device. The gaming machine also includes at least one processor configured to execute instructions, from memory, that: a) display video data for multiple video reels on the second video display device, wherein the video data for each of the multiple video reels depicts a reel strip with multiple reel game symbols; b) permit game play of a reel game of chance that uses the multiple video reels displayed by the second video display device, and c) display video data, on the second video display device, that includes a video data adaptation to the video data for the multiple video reels, wherein the video data adaptation simulates a realistic visual attribute of a real mechanical reel in a gaming machine.

In another aspect, the present invention relates to a method of providing a game of chance on a gaming machine. The method includes displaying the game of chance using a first video display device and/or a second video display device included in the gaming machine. The second video display device is arranged relative to the first video display device such that a common line of sight passes through a video window portion of the first video display device to a video reel portion of the second video display device. The game of chance includes multiple video reels displayed on the second video display device and each video reel includes multiple video symbols on a video reel strip. The method also includes, during the game, simulating the movement of symbols on each video reel in the multiple video reels on the second video display device. The method further includes for one or more of the video reels in the set of video reels, displaying a video data adaptation to video data for one or more of the multiple video reels, wherein the video data adaptation simulates a realistic visual attribute of a real mechanical reel in a gaming machine.

In yet another aspect, the present invention relates to logic encoded in one or more tangible media for execution and, when executed, operable to provide a game of chance on a gaming machine.

These and other features and advantages of the invention will be described in more detail below with reference to the associated figures.

DETAILED DESCRIPTION

Figure 1A:
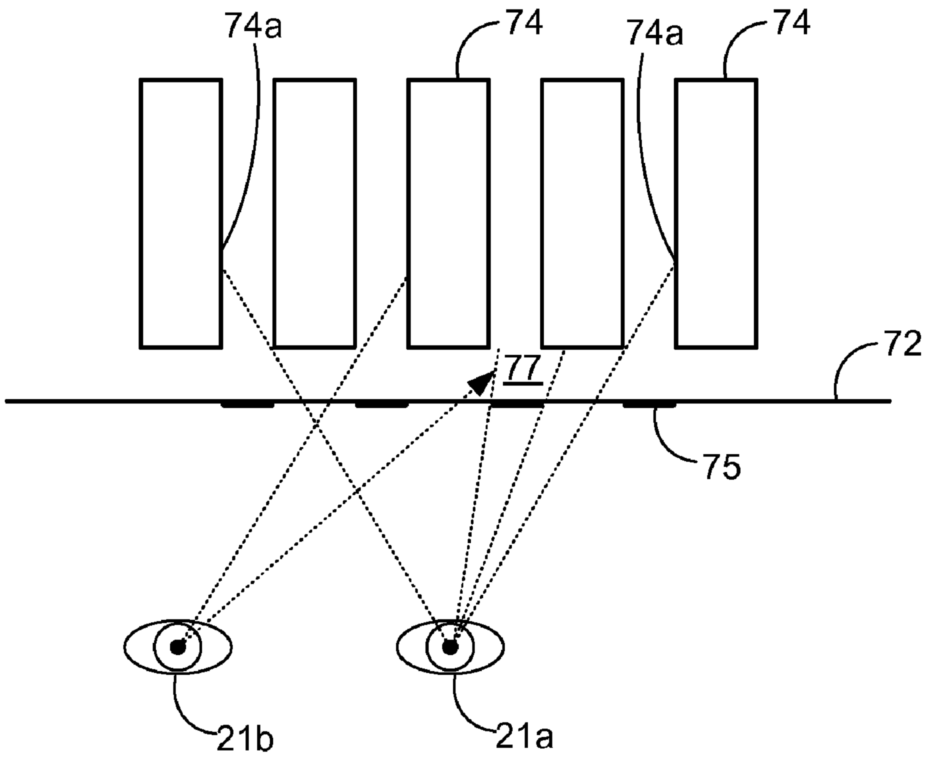
FIG. 1A shows a simple depiction of perspective viewing of a gaming machine with mechanical reels.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Gaming machine manufacturers highly regard customer preference information. When the assignee introduced CRT-based slot machines in 1975, the reaction of some players was less than enthusiastic. The CRT screens jolted players from a gaming activity based on a complex mechanical apparatus to a single, flat, video screen. The technology of 1975 pales in comparison to that of today. And yet, amongst casino patrons and other players, the perceived value of mechanically driven reel slot machines remains high.

Customer preference information belonging to the assignee shows that players trust the old mechanical machines. Some players feel that a lack of mechanically driven reels causes a slot game to be cheapened—and somehow less random. Many players believe that it is impossible to externally tamper with or (to player detriment) control outcomes for a mechanically driven machine. These people also commonly believe that manipulating outcomes portrayed on a video screen is both easily accomplished and undetectable to a player. Others simply prefer the feel and appearance of an electromechanical apparatus as they pull a handle, hear and feel solenoid and latches as they engage and disengage, and watch as spinning reels click into position to display an outcome. A loyal base of players still favors the traditional mechanical stepper machines, even today.

The gradual disappearance of mechanical gaming machines, however, has left admirers of mechanical steppers scrambling to find their preferred machines.

Described herein are processor-based gaming machines that emulate a mechanical reel machine. The gaming machine includes a number of realism adaptations, such as audio, video and/or physical adaptations, where each contributes to the perception of a mechanically driven reel slot machine. Specific embodiments described herein provide video data, for output on a video display device, that adapts video data for one or more of the multiple video reels to realistically simulate a visual attribute of a real mechanical reel apparatus in a gaming machine. These realistic adaptations and simulations are described in further detail below with respect to FIGS. 1-3.

Before describing these embodiments, it is useful to differentiate between three types of reels in a gaming machine: mechanical reels, two-dimensional (2-D) video reels, and realistic video simulation of mechanical reels as described herein.

Mechanical reels refer to the traditional hardware reels, with their associated latches and various mechanical parts. A mechanical reel usually has a set number of symbols disposed about a circumference of a reel strip attached to a wheel. A motor, spring, or other mechanical system physically spins the wheel until it stops at a rotational position and a particular symbol rests in view of a player to indicate an outcome for the reel game. In many older machines, the reels and symbols were spun by potential energy first stored in a spring-loaded mechanism wound and then actuated by the pull of a traditional pull-arm handle. Each reel was stopped at a random position by a mechanical device. The gaming machine senses an outcome, along a central payline, by sensing the position of each reel.

2-D video reels refer to the use of cartoonish animations that caricature reels in a single 2-D video device. The cartoonish animations do not intend to realistically portray actual mechanical reels, nor do they.

Realistic video simulation of mechanical reels, using embodiments described herein, refers to 2-D and/or 3-D hardware and/or software attempts to emulate actual mechanical reels. Their goal is to have a player perceive a real mechanical reel, at least partially. In particular, embodiments described herein contribute to the perception of a mechanically driven reel slot machine by simulating perceived realistic visual attributes of a real mechanical reel in a gaming machine. Briefly, these perceived realistic visual attributes may include one or more of: outward bowing of video reel edges to simulate perceived curvature of an actual circular mechanical reel, variable lighting of video reel displays to simulate perceived reel curvature and out of plane dimensions of an actual curved reel, the inclusion of video simulations of mechanical components between the reel strips (e.g., latches and other mechanisms that a person can see in a mechanical reel gaming machine), backlight blinking of video reel symbols to simulate lighting used in old-fashioned mechanical systems, etc. Other video adaptations are also suitable for use.

The embodiments described herein use video to increase the perception that a processor-based gaming machine includes real mechanical reels. Old mechanical reel-based gaming machines have numerous mechanical attributes—such as mechanical parts and components, 3-D features, and static imperfections—that are visibly perceivable. As the inventor discovered, video data that emulates these visible mechanical attributes can add to the perception of real mechanical machine by a person who is near a processor-based machine.

In one embodiment, embodiments described herein add perspective to the visual display of video reels. This may include virtual perspective in the video data using lighting and geometric adaptations that convey the perception of real reels. In another embodiment, embodiments described herein add parallax using layered displays and an actual distance between the displays.

FIGS. 2-3 below describe embodiments that include video data adaptations that each simulate a realistic visual attribute of a real mechanical reel gaming machine.

In addition to video adaptations, a gaming machine as described herein attempting to emulate a mechanically driven reel slot machine may also include contributions from other sources. The gaming machine may include a combination of audio, video and/or physical adaptations.

Audio adaptations may include: stereo audio that varies output audio based on video reel position in the gaming machine (e.g., audio for a left video reel is output and increasingly heard on a left side of a digital machine, while audio for a right video reel is increasingly heard on the right side of the machine), stereo recording and playback of actual mechanical sounds in a real mechanical reel machine, randomization of the actual mechanical sounds to avoid repetition of the same sounds, etc. Other audio adaptations are also suitable for use.

Figure 4A:
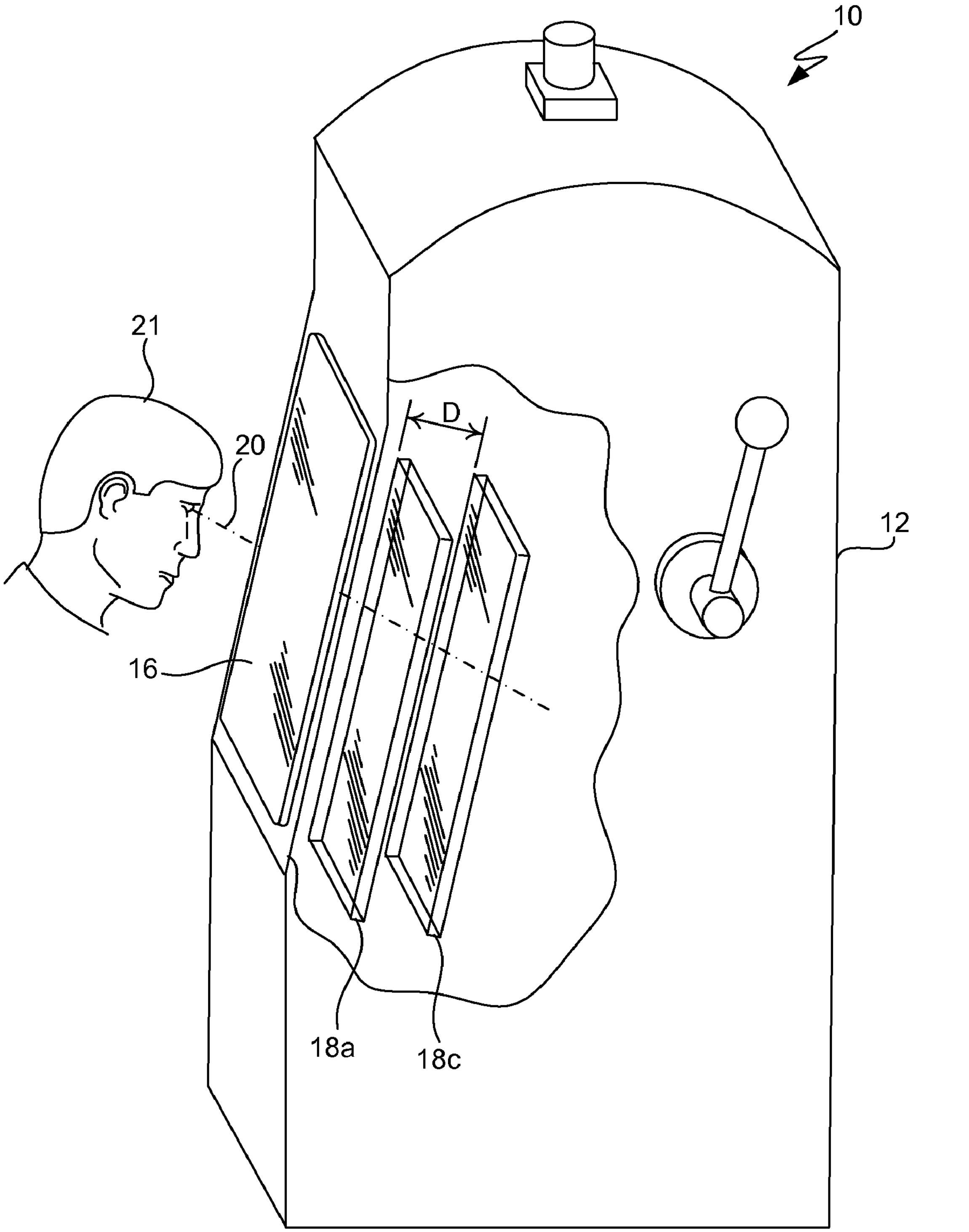
FIG. 4A shows layered displays in a gaming machine in accordance with one embodiment.
Figure 4B:
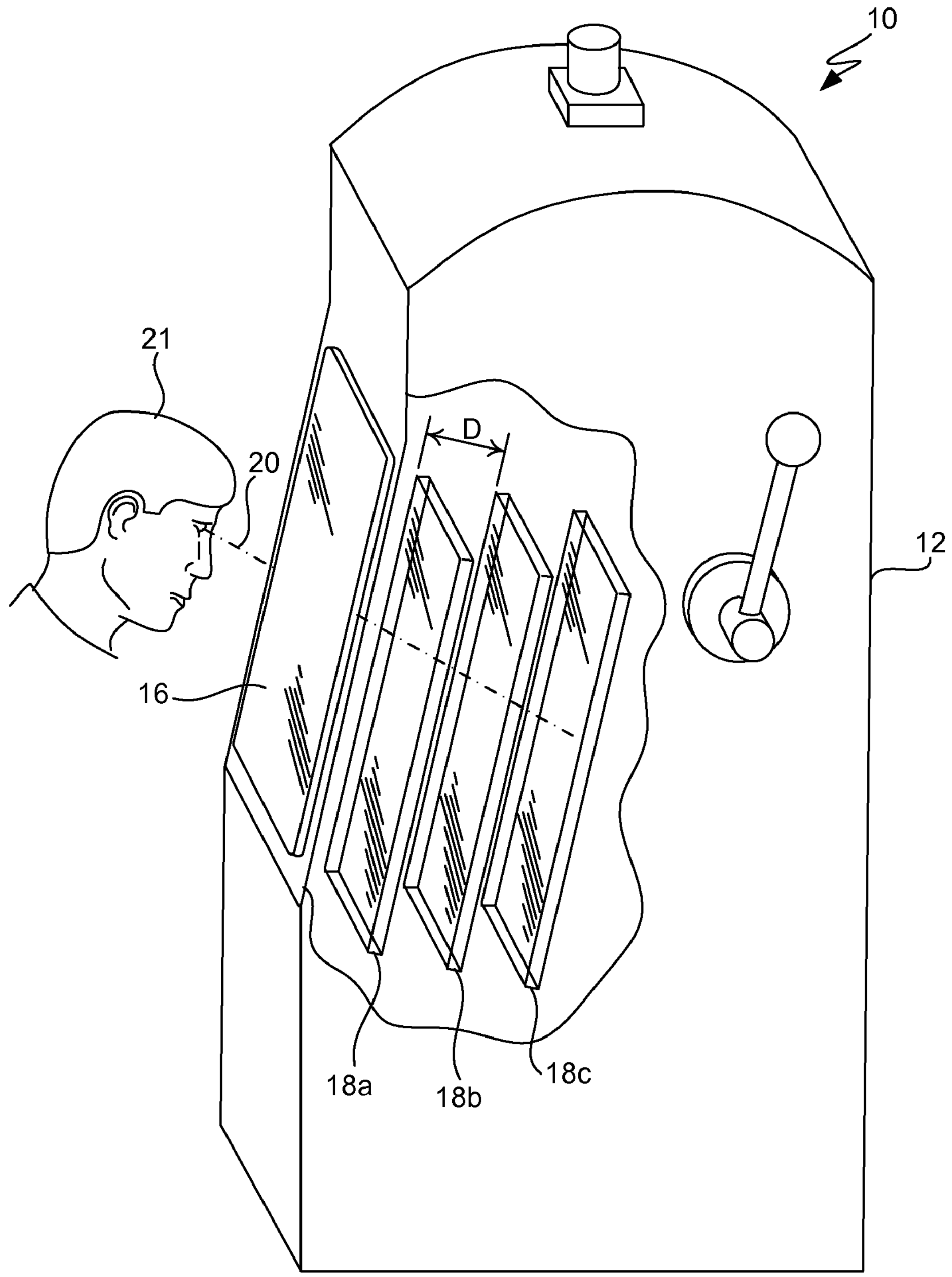
FIG. 4B shows layered displays in a gaming machine in accordance with another embodiment.
Figure 4C:
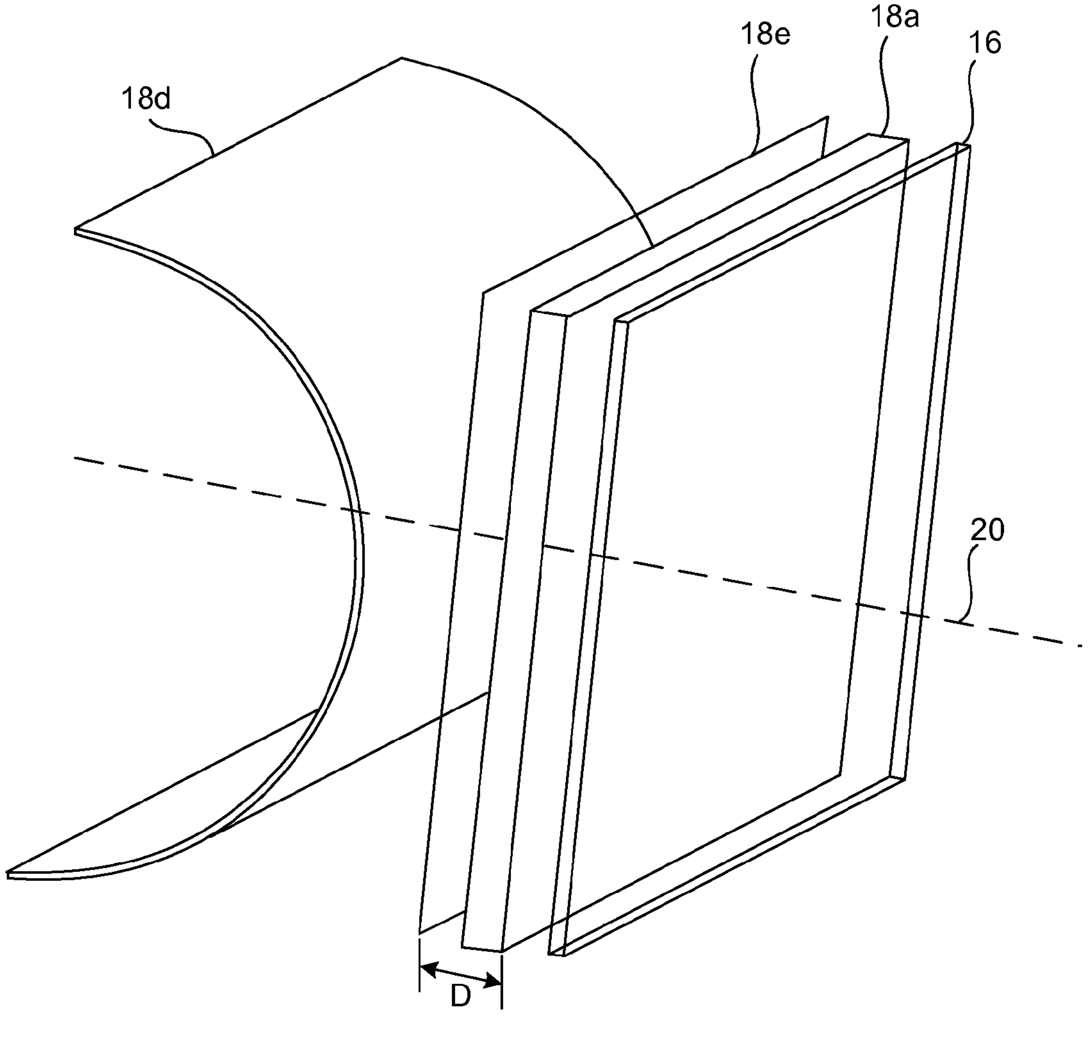
FIG. 4C shows another layered video display device arrangement in accordance with a specific embodiment.

Physical adaptations may include the use of layered video displays with a set distance between the displays. Traditional mechanical reel gaming machines arranged the mechanical reels behind a glass layer, which included screen printing or printed decals attached to the glass. The printing indicated rules for the game, pay tables, and various game graphics. In this multiple video display embodiment, a proximate display device, such as an LCD, includes video data that mimics the glass layer and information typically printed on the glass layer. To increase realism, the video information may also include glare lines and other depictions of interaction of the stickers with an environment around a gaming machine. Video data for stickers may also include video fraying and video discoloration (e.g., dirt that simulates age) to add the realistic simulation of aged and actual stickers. A second video display device, behind the first, which may also be an LCD, then includes video data that simulates the mechanical reels. Physical separation of the two video displays mimics the same separation seen between the glass and reels in a tradition mechanical gaming machines, and significantly adds to the illusion of a real mechanical system. FIGS. 4A-4C describe the use of layered video displays to simulate this mechanical arrangement. Other physical adaptations may be used.

In addition to the video techniques described below, a gaming machine as described herein may use other video adaptations to emulate a mechanical machine. In a specific embodiment, the video data simulates a visible mechanical imperfection of a mechanical reel in a gaming machine. The visible mechanical imperfection refers to visible actions, attributes or behavior of a mechanical reel or one or more parts in a mechanical reel or gaming machine. In one embodiment, the visible mechanical imperfection is dynamic, meaning that the mechanical reel is moving when it displays the visible imperfection. Genesis of the visible imperfections often stem from peculiarities, realities or imperfections in the mechanical device or system, such as loose machining tolerances, random variations which are characteristic of real systems, etc. For example, a simulated video reel may wobble or show lateral jitter in a direction orthogonal to the direction of spin to emulate this common occurrence in a real mechanical reel system. In another specific embodiment, the visible mechanical imperfection includes video reel kick-back, which emulates the dynamic bounce that a real mechanical reel commonly produces when stopped. Video reels may also spin at slightly different speeds to emulate their imperfect mechanical counterparts.

Individually, each of these audio, video and physical adaptations may not create a full illusion of a mechanical reel machine. Cumulatively, however, when multiple of these adaptations are provided in a processor-based gaming machine, senses for a person near the gaming machine process numerous indications of a real mechanical reel machine, and the person may be at least partially or temporarily fooled into perceiving a real mechanical reel machine.

While digital simulation as described herein is not an exact replacement for a truly mechanical machine, it is believed to be a reasonable match that preserves some or most of the "look and feel" of mechanical reel-based machines. These digital machines may satisfy many players looking for a mechanical reel-based machine, while avoiding the associated costs and complexities of old mechanical machines, and permitting the benefits of digital machines. For example, processor-based display devices permit easy reconfiguration of video output, including remote reconfiguration. The digital nature of the video display devices permits the reel game on a gaming machine to be changed using digital techniques. This allows symbols on the video reels to be changed to present a different reel game, if desired, or enables the number of reels depicted on the video display devices to be changed. Wireless or wired connection to the gaming machine also permits remote changes to games by downloading instructions for the changes to the gaming machine.

In one embodiment, a gaming machine described herein adds perspective to the visual display of video reels on a gaming machine. Perspective provides an approximate representation, on a flat surface (such as a video screen), of an image as it is perceived by the eye in three dimensions. Two characteristic features of perspective include: 1) objects appear smaller as their distance from the observer increases; and 2) objects appear distorted when viewed at an angle (spatial foreshortening).

Figure 2A:
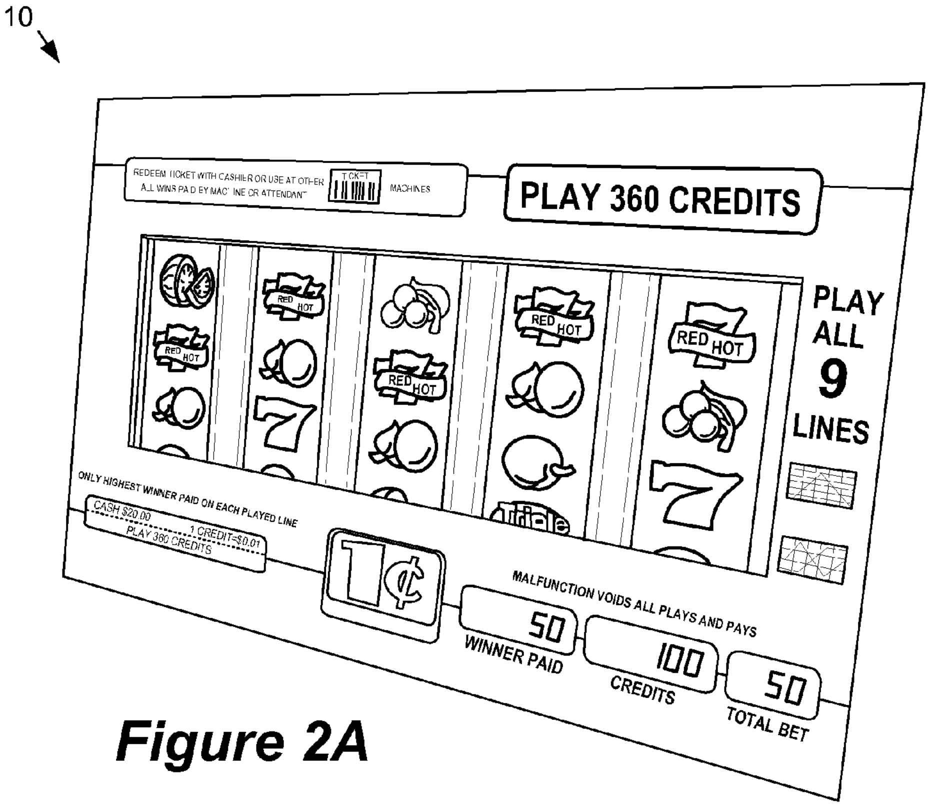
FIG. 2A shows video output on layered displays and configured to realistically simulate mechanical reels in accordance with one embodiment.
Figure 2B:
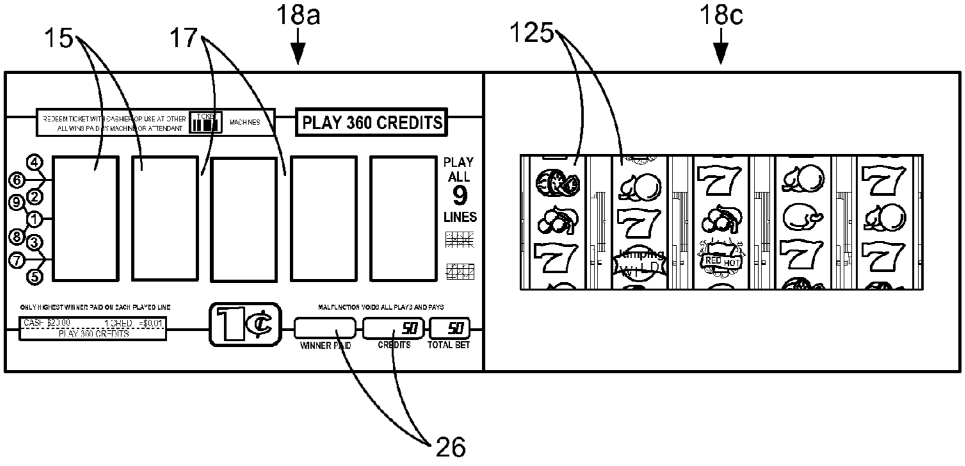
FIG. 2B shows the video output of FIG. 5A separated into front and back video for display on front and back displays, respectively, in accordance with one embodiment.
Figure 2C:
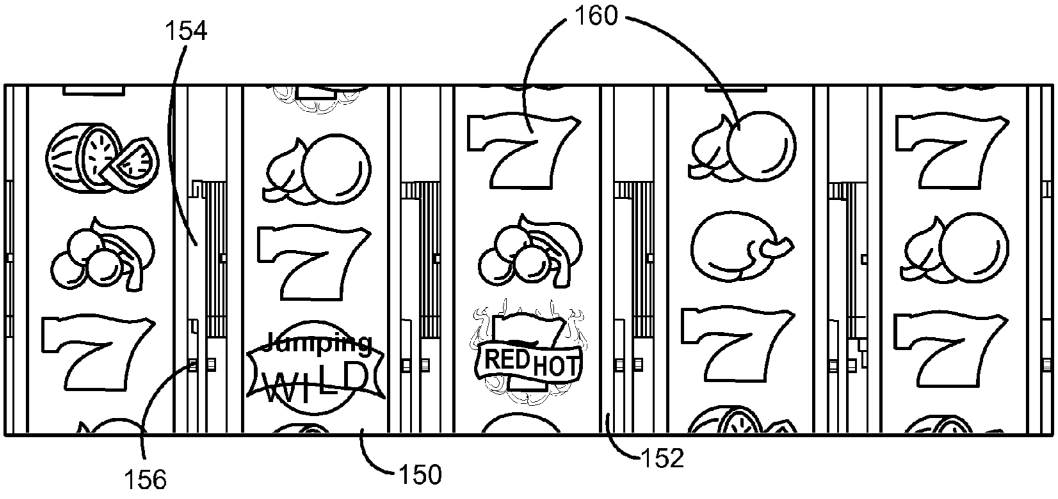
FIG. 2C illustrates the video data output on rear display device of FIG. 2B in greater detail in accordance with a specific embodiment.

FIG. 1A shows a simple depiction of perspective viewing of a gaming machine with mechanical reels. When a person stands or sits laterally central to the horizontal width in position 21*a*, inner sides 74*a* of the outer reels 74 are visible. This adds perspective: the person may see portions 74*a* of reels 74 other than the symbols and reel strips directly facing the person, such as structural components of a reel rotation mechanism, side portions of a mechanical reel, etc. FIGS. 2A-2C show perspective video information added between video reel strips in accordance with a specific embodiment.

In another embodiment, a gaming machine described herein adds parallax to the visual display of video reels on a gaming machine. Parallax refers to the effect whereby the positions of objects relative to each other appear to shift due to changes in the relative angular position of an observer attributable to motion of the observer. In other words, it is a perceived shift of an object relative to another object caused by a change in observer position. If there is no parallax between the two objects, then a person perceives them as side by side at the same depth. This addition of parallax helps the video adaptations described herein better emulate their mechanical counterparts.

FIG. 1A also illustrates parallax. A change in position from 21*a* to 21*b* changes the view of mechanical reels 74 due to parallax. When person 21 moves laterally in front of the gaming machine to a position 21*b* that is not laterally perpendicular to the axis of rotation for reels 74, side portions of different reels 74 become visible. In addition, glass plate 72 includes screen printing or printed decals attached to glass 72. Transparent windows in the screen printing were bordered by opaque sections 75 that partially blocked view of reels 74. A blind spot 77 spot results from an opaque section 75 blocking a portion of the person's field of view. The change in position from 21*a* to 21*b* also changes obstruction based on the relative position between person 21, the opaque sections 75, and reels 74, thus hiding formerly visible portions of the mechanical apparatus—and revealing other portions (e.g., blind spot 77) blocked from view in the previous position.

In one embodiment, a gaming machine includes multiple layers of video display devices that permit parallax. FIGS. 4A-4C show layered display devices suitable for use herein. Hardware suitable for use in the layered displays will be discussed in further detail below with respect to FIGS. 4A-4C.

Layered display devices are well suited to provide visual output that simulates a mechanical reel game. FIG. 2A shows video output on layered displays and configured to realistically simulate mechanical reels in accordance with one embodiment. FIG. 2B shows the video output of FIG. 2A separated into front and back video output, and for provision to front and back layered displays, in accordance with one embodiment. While the present invention will now be shown as graphics for display on a video device, those of skill in the art will appreciate that the following discussion and Figures also refer to methods and systems for providing a game of chance and providing video data on a gaming machine.

As shown in FIGS. 2A and 2B, the layered displays are configured to resemble a traditional mechanical slot machine—both a) spatially and b) using video provided to front display device 18*a* and video provided to rear display device 18*c*. In this case, as shown in FIG. 2B, front display device 18*a* outputs silkscreen video data that resembles a silk-screened glass, while rear display device 18*c* displays five video reels 125 that simulate and resemble traditional mechanical reels. Reels 125 "spin" during game play using changing video data provided to rear display device 18*c*.

Exterior display device 18*a* includes transparent video window portions 15 that permit viewing of the virtual slot reels that are shown on the distal display device 18*c*. Video data provided to displays 18*a* and 18*c* is configured such that a common line of sight passes through each video window portion 15 of front display device 18*a* to a video reel 125 of rear display device 18*c*. Other peripheral portions of the exterior display device 18*a* show a pay table, credit information, and other game relevant information, such as whether a bonus game or progressive game is available. Unlike a traditional mechanical machine where the silkscreen information is relatively permanent, this game relevant information may be changed by simply changing the video data provided to display device 18*c*.

Briefly referring to FIGS. 4A and 4B, a predetermined spatial distance "D" separates display screens for the layered display devices 18*a* and 18*c*. As shown in FIG. 4A or 4B, the predetermined distance, D, represents the distance from the display surface of display device 18*a* to display surface of display device 18*b* (FIG. 4B) or display device 18*c* (FIG. 4A). This distance may be adapted as desired by a gaming machine manufacturer. In one embodiment, the display screens are positioned adjacent to each other such that only a thickness of the display screens separates the display surfaces. In this case, the distance D depends on the thickness of the exterior display screen. In a specific embodiment, distance "D" is selected to minimize spatial perception of interference patterns between the screens.

This distance improves perception of a three-dimensional device. First, spatially separating the devices 18*a* and 18*c* allows a person to perceive actual depth between video output on display device 18*a* and video output on rear display device 18*c*. The output of FIG. 2A shows a silkscreen that is physically separated from the reels, which emulates a real mechanical reel machine. This depth perception is as real for video devices 18 as it is for a traditional mechanically driven reel slot machine.

The layered displays also add parallax to the processor-based machine. More specifically, the bars 17 (FIG. 2B) permit a person 21 to vary what portions of display device 18*c* that they see behind the bars (FIGS. 1A and 2A)—based on a current position and viewing angle for the person. Thus, when a person moves relative to bars 17 and the gaming machine, lines of sight though window portions 15 change, which changes the portions of display device 18*c* (FIG. 2B) that are visible. This grants true parallax and three-dimensional depth perception. Again, this helps the processor-based gaming machine emulate a traditional mechanically driven reel slot machine.

Figure 1B:
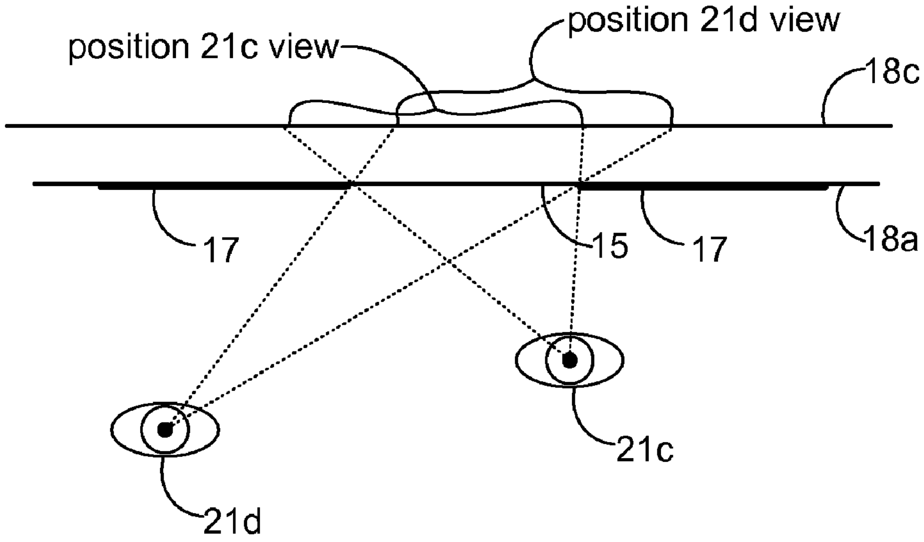
FIG. 1B shows a simple depiction of changing position in front of a video reel gaming machine with windows on a front panel and the effect of changing position on visibility of a rear display device.

As with a traditional mechanical reel apparatus, changes in player position will change the visible portions of video data shown on rear display device 18*c* when viewed through a transparent window 15 on front display device 18*a*. FIG. 1B shows a simple depiction of changing position in front of a video reel gaming machine with transparent video windows 15 on a front panel 18*a* and the effect of changing position on visibility of rear display device 18*c*. This provides a degree of parallax which is unavailable with only one display device. For example, the physical separation of display devices 18*a* and 18*c* provides a degree of parallax which, among other things, allows an observer to peek underneath the edges of the windows 15 and bars 17, as one might do in a traditional mechanical machine.

FIG. 2C shows the video data output on rear display device 18*c* in greater detail in accordance with a specific embodiment. The video data includes multiple video data adaptations to the video reels that each simulate a realistic visual attribute of a real mechanical reel in a gaming machine. Depending on the current position of a person standing in front of gaming machine 10, a person may see video data that simulates: a hardware reel 152 that each reel strip 150 appears to attach to, a rotary axis 154 that each hardware reel 152 appears to rotate about, a latching mechanism 156 that appears to stop each hardware reel 152 from rotating, along with other simulated internal mechanical components often found in a real mechanical reel gaming machine.

Thus, owing to the parallax resulting from the multiple display devices 18 and the ability for a person to see between and outside of the specific reel strips 150, video data provided to rear display device 18*c* may include additional video data other than reel strips 150 and symbols on the reel strips to further promote the realistic depiction of an actual stepper machine. The video data adaptations may include, but are not limited to, edges of the reel 152 assemblies not covered by reel strips 150, portions of the mechanical apparatus supporting the rotating reels 152, background components (including, but not limited to, plates, covers, switches, levers, solenoids, latches, handles, and other similar items), stickers, labels, wires, and anything else that may normally be found inside a traditional reel gaming machine and that may be incidentally viewed by an observer peering through a transparent window on a fixed glass plate. Other mechanical components may be simulated in the video data adaptations provided to rear display device 18*c*.

Video data in FIG. 2C also includes perspective. Various embodiments that add perspective will now be discussed.

A person standing in front of a gaming machine and looking at a traditional mechanical reel benefits from depth perception of the three dimensional curved reel. As a result, an actual mechanical reel is often perceived with a slight bi-concave shape on its lateral edges.

Figure 3A:
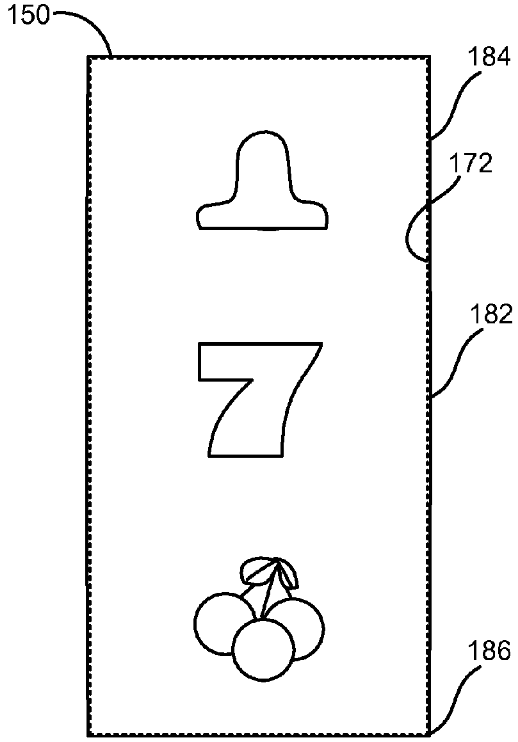
FIG. 3A shows a video reel strip with slight curvature on its lateral sides in accordance with one embodiment.

In a specific embodiment, a video reel includes a slight outward bowing of the lateral sides of the video reel to better simulate its mechanical counterpart. This outward bowing is only slightly done, and is illustrated in FIG. 3A. This effect is also included in the video data of reels 125 of FIGS. 2A-2C.

Referring to FIG. 3A, video reel strip 150 includes slight outward curvature on its two lateral sides. A contrast box 172 (shown by a dotted line) includes true rectangular dimensions and is placed within the perimeter of video strip 150 to illustrate the slight outward curvature at the lateral sides of video reel strip 150.

In one embodiment, the central portion of video reel strip 150 includes a larger width than rectangular contrast box 172.

In another embodiment, the top and bottom portions of each side are laterally decreased to create the outwardly bowed sides.

Figure 1C:
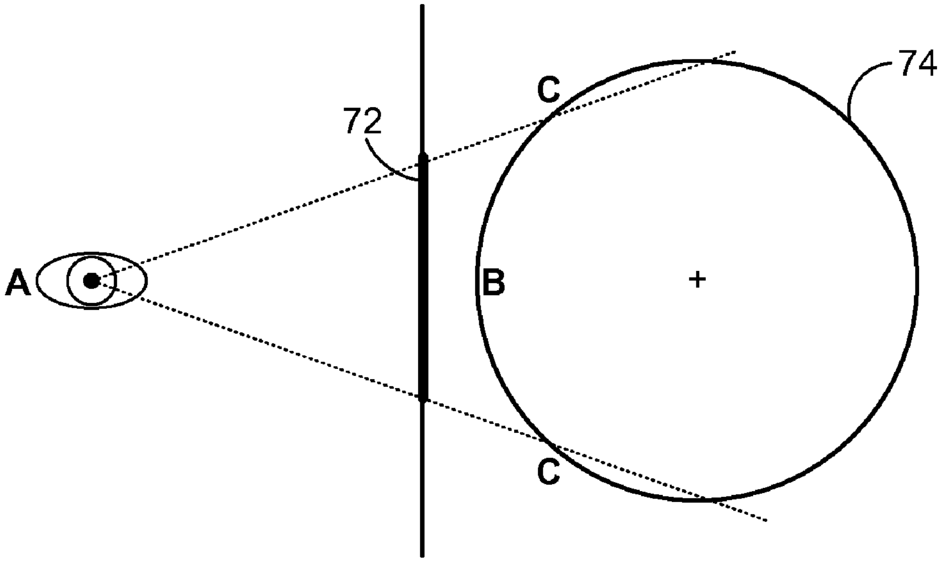
FIG. 1C shows a simple depiction of perspective for curved mechanical reels when viewing from in front of a mechanical reel gaming machine.

In general, objects that subtend a greater angle at the human eye are perceived to be closer than objects that subtend a smaller angle. Referring to FIG. 1C, since the center B of reel 74 is closer to an observation point A than are the upper and lower edges C of viewable portion of reel 74, the human visual processing subconsciously expects a uniform-width reel strip to appear wider at the closest point B than at the edge points C. This apparent variation in width depends on the distance difference between the observer and the center and edge viewing points. The absence of this bowing and slight curvature will be noticeable to observers if they are attempting to ascertain whether the reel strip is genuine or merely an image, or it may just create enough of a visual inconsistency that the observer senses that "something just isn't right" without being able to identify the specific anomaly. By providing a suitable degree of bowing or convexity to the lateral edges of video reel strip 150 video data on display device 18*c*, a person's visual expectation may be fulfilled.

An excessive amount of curvature is undesirable. Too much curvature is typically immediately recognizable as unrealistic and destroys the illusion of a real reel. In some cases, too much curvature tends to make the video reel seem balloon-like and cartoonish. Experimentally, an un upper bound on curvature was determined when the bowing and outward curvature transitioned from barely noticeable to excessive, at which point the reel strip 150 images appeared cartoonish. In one embodiment, the upper limit of reel width curvature (after which the reels transition in perception from quasi-realistic to cartoon-like) is such that a reel strip width at a central portion 182 is greater than a width for bottom and top portions 184 and 186 by less than about 5 percent. For example, if reel strip 150 includes a center width of 160 millimeters wide, then reel strip 150 width at the top and bottom edges may be no less than about 152 millimeters. In a specific embodiment, a reel strip width at a central portion 182 is greater than a width for bottom and top portions 184 and 186 by less than about 2 percent to about 3 percent. Thus, the amount of curvature is slight: enough to create the perceived effect, but not too much. The exact amount of curvature to be applied to the video reel strip 150 may vary with a number of visual attributes of the image, such as: the modeled radius of video reel 152, the width of the simulated reel strip 150, the relative size of video reel 152 with respect to the rest of the images, the number of reels 152, the ratio of the width of reel 152 to its height, the ratio of reel 152 width to the spacing between adjacent reels, etc.

Figure 3B:
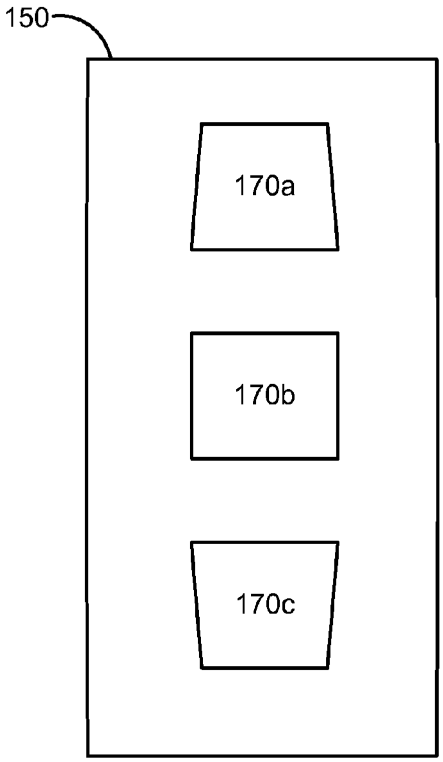
FIG. 3B shows a graphical simplification of perspective video adaptations applied to reel symbols sides in accordance with one embodiment.

The video data may also include simulated perspective in the reel symbols. In a specific embodiment, shape of a symbol 160 on a reel strip 150 depends on its position on reel 152. FIG. 3B shows a graphical simplification of this simulated perspective (the effect is amplified for discussion); the symbols in FIG. 2C also includes this effect to a more realistic effect.

The same perceived 'size-versus-viewing distance' phenomenon discussed above with respect to FIG. 1C also affects symbols printed on a reel strip. Referring back to FIG. 1C, reel 74 curvature affects the difference in distance at the extreme edges C of the visible portion of the reel. Symbol B, located at the center of the reel, is unaffected by this phenomenon because its upper and lower edges are approximately equidistant from the observer.

Referring to FIG. 3B, the lower edge of a symbol 170*a*, located at the uppermost portion of reel strip 150 (and a transparent reel window 15 of display device 18*a*, but not shown), is closer to a person standing in front of the gaming machine and more normal to the person's view than the upper edge of the symbol 170*a*. Correspondingly, the lower edge of symbol 170*a* appears slightly larger to the player than the upper edge, which is farther away.

Re-creating this effect in the all-video simulation may be accomplished by introducing a measure of "keystoning" to the symbols. As shown in FIG. 3B, upper symbol 170*a* and lower symbol 170*c* have been given a slight trapezoidal shape that conveys the sensation that the extreme edges are farther away than are the edges disposed closer to the center of the reel. This adds to the perceived sensation of curvature of video reel 152 by altering the shape of each symbol 170, depending on the position of each symbol 170 on the reel. The amount of keystoning may use the width ratios used for video reel strip 150 described above. More specifically, the width of each symbol 170 at a particular position on strip 150 may be reduced by the ratio of the width of its current position to the maximum lateral width at central portion 182. In one specific embodiment, implementation of this technique uses multiple versions of each reel symbol 170 in game memory, where a slightly different version with appropriate geometric modification is used for each different reel rotational position. For example, in a game with three horizontal paylines, a distinct version of each symbol may be used for the upper, center, and lower paylines, respectively. In another specific embodiment, symbol 170 is resized in real time by altering physical dimensions of symbol 170 using a scalar based on rotational position for symbol 170 on the reel 152.

The present invention may also use preferential lighting to emulate a real mechanical reel gaming machine. When a person stands in front of a mechanical reel gaming machine, lighting in the ambient room differentially illuminates the reels based on the outward position. Typically, light sources from above, such as ceiling lights, favorably illuminate outer (or protruding) and upper portions of the reel. In one embodiment, the video data provided to the layered displays illuminates and shades the silkscreen video data on the proximate display device to include glare lines and other lighting artifacts for a smooth and shiny emulated surface.

Figure 3C:
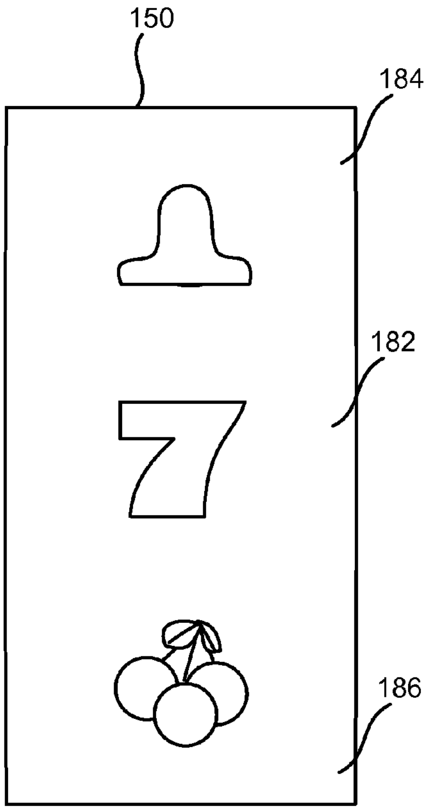
FIG. 3C shows a simplified version of simulated preferential lighting of a reel strip in accordance with one embodiment.

In another embodiment, the video data provided to the distal video display device illuminates and shades the video reels to simulate lighting of their mechanical counterparts. FIG. 3C shows simulated video preferential lighting of a reel strip in accordance with one embodiment. FIG. 2C shows an actual picture of simulated preferential lighting of video reels 152 and video reel strips 150 on a distal display device 18*c* in accordance with a specific embodiment.

Reels in a mechanical stepper gaming machine may be illuminated by a variety of light sources that produce different lighting effects. In one embodiment, the video data emulates "back-lighting", which is a traditional mechanical reel lighting technique that uses incandescent, fluorescent, LED, or other light sources disposed within a circumference of the reel behind the reel strip. Back-lighting produces light that passes through translucent and transparent portions of a physical reel strip, including the gaps and white spaces between adjacent symbols. Older mechanical gaming machines often used a light bulb for this effect; newer machines may use one or more LEDs. The light is commonly focused in the direction of a player/observer, which creates a region of maximum brightness near the center of the strip, and tapers to a lesser brightness at the upper and lower edges. Reel angles also contribute to this effect: light passing through the center of the strip transmits through the reel strip material essentially normal to its surface, while light at the upper and lower portions passes through at an angle where the light propagation path length includes more reel strip material. As the normal path through the reel strip material involves less material than does the angled path, the light is attenuated less along the normal path and that region appears brighter. Circular geometry of the mechanical reels thus geometrically affects the light levels, and thus the back-lighting effect lends to the perception of curvature for a mechanical reel. FIG. 3C shows simulated video back-lighting of a reel strip in accordance with this embodiment.

Figure 3D:
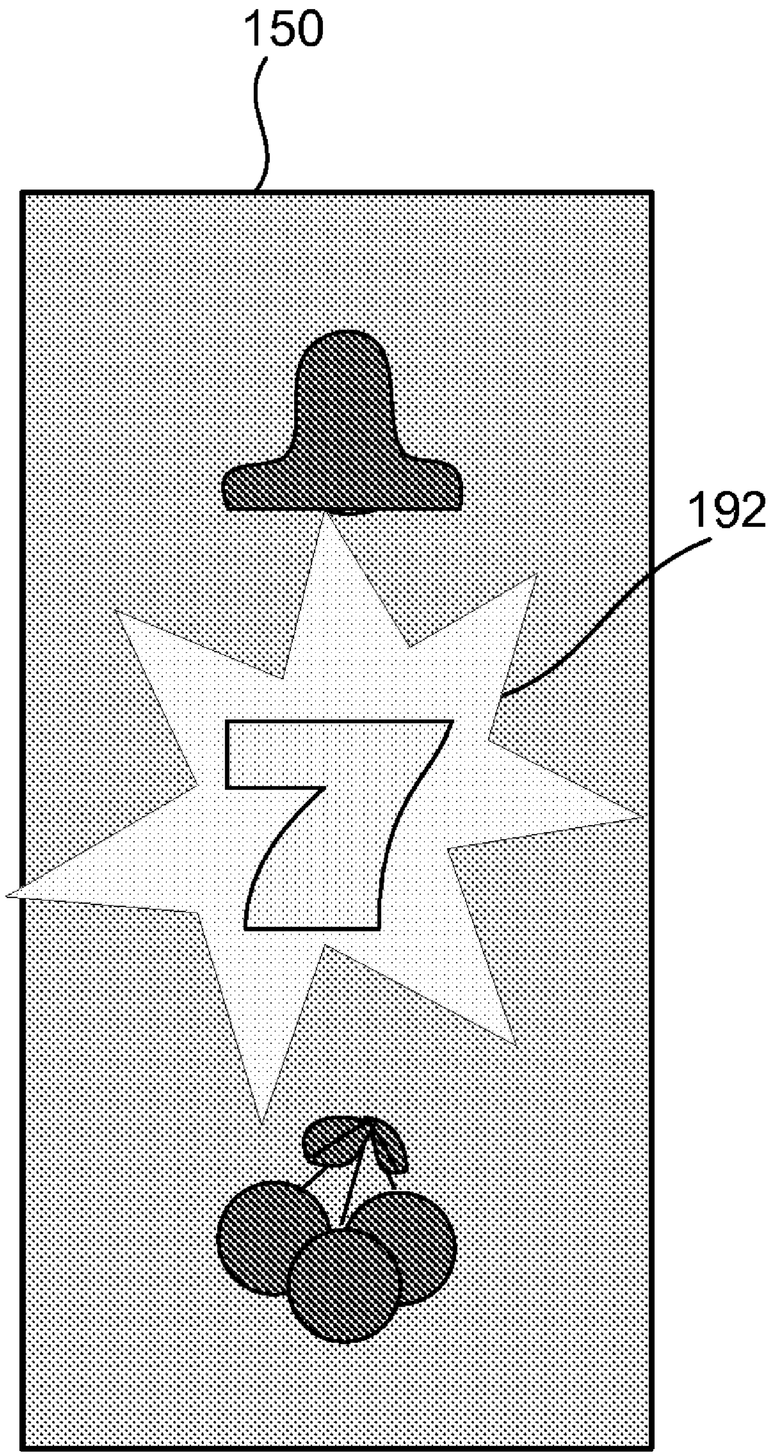
FIG. 3D shows a simplified version of simulated back-lighting for reel strip in accordance with one embodiment.

Simulated video reels described herein may artistically emulate certain effects from back-lighting techniques traditionally used with to actual mechanical reels to achieve a more realistic effect. FIG. 3D shows an example of this technique applied to reel strip 150 in accordance with one embodiment. In this case, the back-lighting resembles a mechanical cut-out 192 in the central portion of reel strip 150 through which more light passes through the reel strip 150. This provides a static and mechanical-looking appearance to the back-lighting used in some older gaming machines. Central lighting of video reel 150 simulates light produced by a light bulb or other mechanical light source behind a central portion 192 of the reel that corresponds to a fixed position of a virtual light bulb behind the video reel strip 150.

In another specific embodiment, back-lighting gradually alters the luminance in reel strip 150 to resemble the geometrically effects of a circular reel. As shown in FIG. 3C, gradual reduction in reel strip luminance from the center 182 toward each of the upper and lower portions 184 and 186 simulates the effect of backlighting on a curved reel strip and conveys a degree of curvature. In this specific embodiment, the desired degree of luminance graduation depends upon a number of factors, including the overall brightness of the rest of the game images and video data, the radius of the reels 152 being simulated, the density and coloration of the symbols on the reel strips 150, the set distance between screens (D), the ambient illumination level to which the gaming machine will be subjected, and other factors that one of skill in the art will appreciate.

Thus, by artistically altering video data for the color, hue, luminance, brightness, or intensity of reel strip 150 of images provided to rear display device 18*c* to mimic the backlighting of an actual reel, a flat image on rear display device 18*c* produces a perceived curved appearance.

Other simulated reel lighting techniques may be used. Suitable simulated traditional reel lighting techniques may use: a single simulated light source for multiple reels 152 or reel strip 150, separate simulated light sources for each reel 152, separate simulated light sources for each symbol on a reel strip 150, or a combination of these techniques.

The back-lighting may occur at a variety of times during game play. When a winning outcome is displayed on a traditional machine, it commonplace to highlight the winning payline. This helps a player readily identify the winning outcome. One common technique involves blinking or flashing the symbols on the winning payline. In the all-video simulation, this effect may be replicated with a high degree of accuracy by varying or alternating the brightness, color balance, hue, saturation, gamma correction, or other characteristic of a video image to emulate mechanical performance.

Video lighting also provides visual enhancement possibilities that have not been implemented in traditional gaming machines. The ability to manipulate images in video empowers a video simulation in unpractical ways for a traditional machine. For example, a traditional apparatus has difficulty highlighting a particular symbol with a particular color of light so as to temporarily change the overall color scheme of that symbol. The presence of white light illuminating adjacent symbols tends to bleed into the highlighted symbols and wash out any specially intended color, which diminishes the effect. While possible, reducing the undesired bleed requires a more intricate backlighting system, which increases machine cost and complexity. In a video simulation, however, the game designer can easily alter the color of any portion or portions of the symbol, so alternating between the original and altered images will create a blinking effect based on color in lieu of, or in addition to, blinking based on luminance intensity. Even though this is difficult to achieve in the actual mechanical stepper, the effect can be artistically manipulated in video to appear very mechanical and realistic so that the player's illusion of playing a traditional machine is not contradicted by this effect.

Figure 1D:
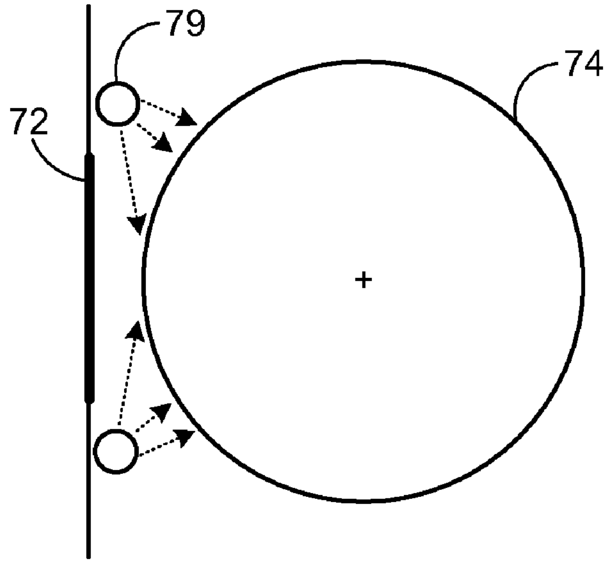
FIG. 1D shows a fore-lighting technique used in some mechanical reel gaming machines with opaque reel strips.

Other methods of highlighting reel strips are also contemplated. Some mechanical reel strips are generally opaque and use lighting applied to a front surface of the reels, in lieu of back-lighting. This is referred to as fore-lighting. FIG. 1D shows a fore-lighting technique used in some gaming machines with opaque reel strips. A common traditional way to achieve fore-lighting uses of fluorescent tubes 79 disposed between the fixed glass panel 72 and reels 74; each tube 79 runs above and parallel to the reels 74 and behind the transparent reel windows in the fixed glass plate 72. This provides strong illumination for reel 74 surfaces closest to the top and bottom window edges, which are also close to the fluorescent tubes 79. However, since the central portion of reel 74 is disposed farther from each light source 79, the intensity at that greater distance is less than at the reel surfaces disposed closer to the light. In addition, the curvature of the reel 74 surface effectively produces a shadowing effect for each of the two light sources on an opposite side of the reel 74 to the light source, which may also be simulated in video to increase mechanical emulation. FIG. 1D shows that the light from each source 79 approaches a "grazing" path at the center of reel 74 before its curvature results in shadowing. This results in a lower level of illumination for the center of reel 74 than for its upper and lower portions, creating a gradient opposite that of the backlit reel scenario. While back-lighting exhibits a relatively brighter region near the center of a reel, front-lighting results in a darker area around the reel center.

In a specific embodiment, the simulated reel video data assumes that illumination of uses light sources above or in front of the video reels 152. This preferentially illuminates top and bottom portions of the video reel and reduces luminance for a central portion of the reel and reel strip. In this case, the simulation adds shading to a central portion of reel strip 150, while the simulation adds illumination to top and bottom portions and, respectively, relative to an average luminance for the video data on the reel strip 150. More specifically, a central portion 182 includes relatively less luminance than the average luminance for reel strip 150. Upper and lower portions 184 and 186 each include a higher luminance than the average luminance for reel strip 150. The amount of additional luminance for top and bottom portions will vary with a number of factors such as: how much a designer wants this effect to be perceived, size of the reel being mimicked, etc.

Fore-lighting creates another differential lighting effect that may be simulated in video. This front-lighting effect can be simulated by altering the color, hue, luminance, brightness, or intensity of the reel strip images on display device 18*c*. The brightness settings at the reel center and edges depend upon a number of factors, including the overall brightness of the rest of the game images, the radius of the reels being simulated, the ratio of the reel radius to the size of the transparent reel window, the reflectivity of the reel strip material being simulated, the density and coloration of the symbols on the reel strips, the ambient illumination level to which the gaming machine will be subjected, etc.

Other lighting techniques may be employed to convey a sense of curvature to the video reels 152. In general, this may include adapting the color, hue, luminance, brightness, and/or intensity of the video data in a reel strip image.

In one embodiment, the realistic video adaptations described above are output on a gaming machine having a single display device that outputs video information for a game. As the term is used herein, a display device refers to any device configured to output a visual image in response to a control signal. In one embodiment, the display device includes a screen of a finite thickness, also referred to herein as a display screen. For example, LCD display devices often include a flat panel that includes a series of layers, one of which includes a layer of pixilated light transmission elements for selectively filtering red, green and blue data from a white light source. Each display device is adapted to receive signals from a processor, video processor or controller included in the gaming machine and to generate and display graphics and images to a person near the gaming machine. The format of the signal will depend on the device. In one embodiment, all the display devices in a layered arrangement respond to digital signals. For example, the red, green and blue pixilated light transmission elements for an LCD device typically respond to digital control signals to generate colored light, as desired.

In another embodiment, the gaming machine includes multiple display devices arranged in a common line of sight relative to a person near the gaming machine. Multiple display devices disposed along a common line of sight are referred to herein as 'layered' displays. In one embodiment, the gaming machine includes two display devices, including a first, foremost or exterior display device and a second, underlying or interior display device. For example, the exterior display device may include a transparent LCD panel while the interior display device includes a second LCD panel.

Referring primarily now to FIGS. 4A and 4B, a gaming machine 10 of a specific embodiment with layered displays includes a cabinet or housing 12 that houses exterior display device 18*a*, intermediate display device 18*b* (FIG. 4B only), interior display device 18*c* and a touchscreen 16.

Layered display devices may be described according to their position along a common line of sight relative to a viewer. As the terms are used herein, 'proximate' refers to a display device that is closer to a person, along a common line of sight (such as 20 in FIG. 4A), than another display device. Conversely, 'distal' refers to a display device that is farther from a person, along the common line of sight, than another. While the layered displays of FIGS. 4A and 4B are shown set back from touchscreen 16; this is for illustrative purposes and the exterior display device 18*a* may be closer to touchscreen 16.

The video displays, however, permit digital output and all its benefits. For example, the digital domain permits external loading and changing of simulated reel games. This permits a casino or gaming establishment to change video on each of the layered display devices, and their transparency, without physically altering the gaming machine or requiring maintenance. Thus, the number of virtual slot reels 125 may be changed from 3 to 5 to 9, or some other number. In this case, the intermediate and exterior display devices change the position of their transparent window portions 15 for viewing of the different number of virtual slot reels. Symbols on each virtual slot reel 125 may also be changed. Also, a pay table shown on display device 18*a* may be changed at will, in addition to changing whether a bonus or progressive game is shown on the intermediate display device. This permits the same gaming machine to play new games simply by downloading a data onto the machine. For a mechanical machine, this game change traditionally required manual and mechanical reconfiguration of a gaming machine, e.g., to change the number of reels for new reel game that requires five reels instead of three.

Figure 6:
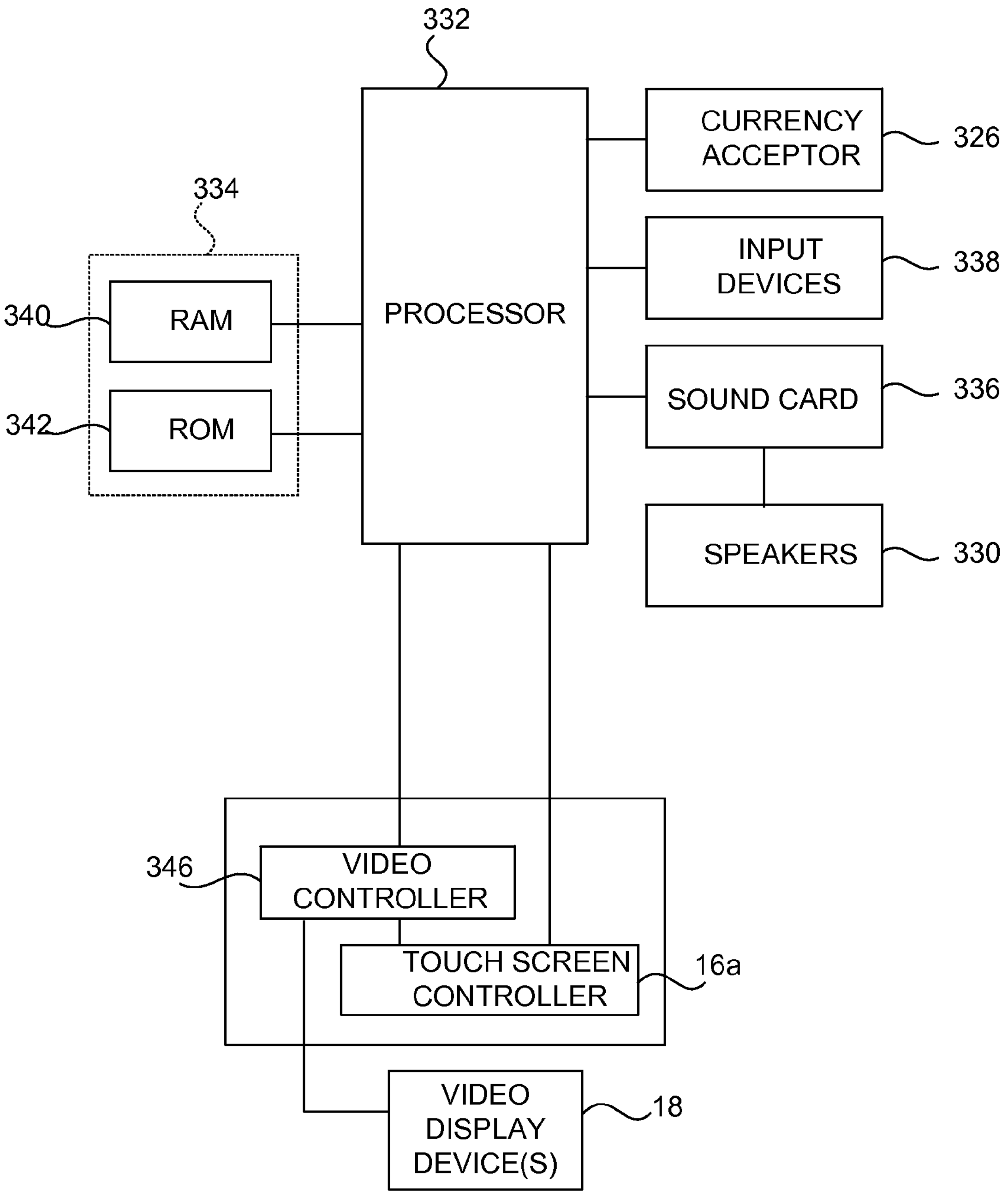
FIG. 6 illustrates a control configuration for use in a gaming machine in accordance with another specific embodiment.

Referring to FIGS. 4A, 4B and 6, layered displays and their operation will be further described. Processor 332 controls the operation of components in gaming machine 10 to present one or more games, receive player inputs using the touchscreen 16, and control other gaming interactions between the gaming machine and a person 21. Under the control of processor 332, display devices 18 generate visual information for game play by a person 21. As shown in FIG. 4A, there are two layered display devices 18: a first, exterior or frontmost display device 18*a*, and a backmost display screen 18*c*. As shown in FIG. 4B, there are three layered display devices 18: frontmost display device 18*a*, a second or intermediate display device 18*b*, and a backmost display screen 18*c*. The display devices 18*a*, 18*b* and 18*c* are mounted and oriented within the cabinet 12 in such a manner that a straight and common line of sight 20 intersects the display screens of all three display devices 18*a*, 18*b* and 18*c*. In addition, display devices 18*a*, 18*b* and 18*c* are all relatively flat and aligned about in parallel to provide a plurality of common lines of sight that intersect screens for all three.

The gaming machine may also include one or more light sources. In one embodiment, display devices 18 include LCD panels and at least one light source that provides light, such as white light, to the pixilated filter elements on each LCD panel. For example, a back lighting source (not shown) may be positioned behind display device 18*c*. The pixilated panel for each parallel display device 18*a*, 18*b* and 18*c* then filters white light from the backmost backlight to controllably output color images on each screen.

Other light sources may be used to illuminate a reflective or transmissive light filter. For example, each display device 18 may be individually illuminated using a white light source attached near the sides (top, bottom, left, and/or right) of each pixelating panel; the side light source may include a mini-fluorescence source and light guide that transmits light from the side light source, down the flat panel, and to all the pixilated filter elements in the planar LCD panel for pixilated image production. Other suitable light sources may include cold cathode fluorescent light sources (CCFLs) and/or light emitting diodes, for example.

In another embodiment, a distal and emissive display device is arranged behind a proximate and non-emissive display device, and provides light to the proximate display device, which then filters the light to create an image. For example, a flat OLED or plasma display device 18*c* may be used to a) produce an image and b) to emit light that is filtered by LCD panels 18*a* and 18*b*. In this case, the distal and emissive display device emits at least some white light. For example, video output of one or more reels may include significant white light that is also used to illuminate one or more LCD panels for pixilated filtering. In another embodiment, the proximate LCD panels use reflective light where the light comes from in front of the gaming machine, e.g., from the ambient room.

The proximate display devices 18*a* and 18*b* each have the capacity to be partially or completely transparent or translucent. In a specific embodiment, the relatively flat and thin display devices 18*a* and 18*b* are liquid crystal display devices (LCDs). Other display technologies are also suitable for use. Various companies have developed relatively flat display devices that have the capacity to be transparent or translucent. One such company is Uni-Pixel Displays, Inc., Inc. of Houston Tex., which sells display screens that employ time multiplex optical shutter (TMOS) technology. This TMOS display technology includes: (a) selectively controlled pixels that shutter light out of a light guidance substrate by violating the light guidance conditions of the substrate and (b) a system for repeatedly causing such violation in a time multiplex fashion. The display screens that embody TMOS technology are inherently transparent and they can be switched to display colors in any pixel area. A transparent OLED may also be used. An electroluminescent display is also suitable for use with proximate display devices 18*a* and 18*b*. Also, Planar Systems Inc. of Beaverton Oreg. and Samsung of Korea, both produce several display devices that are suitable for use herein and that can be translucent or transparent. Kent Displays Inc. of Kent Ohio also produces Cholesteric LCD display devices that operate as a light valve and/or a monochrome LCD panel.

FIG. 4C shows another layered video display device arrangement in accordance with a specific embodiment. In this arrangement, a touchscreen 16 is arranged in front of an exterior LCD panel 18*a*, an intermediate light valve 18*e* and a curved display device 18*d*.

A common line of sight 20 passes through all four layered devices. As the term is used herein, a common line of sight refers to a straight line that intersects a portion of each display device. The line of sight is a geometric construct used herein for describing a spatial arrangement of display devices. If all the proximate display devices are transparent along the line of sight, then a person should be able see through all the display devices along the line of sight. Multiple lines of sight may also be present in many instances.

Light valve 18*e* selectively permits light to pass therethrough in response to a control signal. Various devices may be utilized for the light valve 18*e*, including, but not limited to, suspended particle devices (SPD), Cholesteric LCD devices, electrochromic devices, polymer dispersed liquid crystal (PDLC) devices, etc. Light valve 18*e* switches between being transparent, and being opaque (or translucent), depending on a received control signal. For example, SPDs and PDLC devices become transparent when a current is applied and become opaque or translucent when little or no current is applied. On the other hand, electrochromic devices become opaque when a current is applied and transparent when little or no current is applied. Additionally, light valve 18*e* may attain varying levels of translucency and opaqueness. For example, while a PDLC device is generally either transparent or opaque, suspended particle devices and electrochromic devices allow for varying degrees of transparency, opaqueness or translucency, depending on the applied current level.

In one embodiment, the gaming machine includes a touchscreen 16 disposed outside the exterior video display device 18*a*. Touchscreen 16 detects and senses pressure, and in some cases varying degrees of pressure, applied by a person to the touchscreen 16. Touchscreen 16 may include a capacitive, resistive, acoustic or other pressure sensitive technology. Electrical communication between touchscreen 16 and the gaming machine processor enable the processor to detect a player pressing on an area of the display screen (and, for some touchscreens, how hard a player is pushing on a particular area of the display screen). Using one or more programs stored within memory of the gaming machine, the processor enables a player to activate game elements or functions by applying pressure to certain portions of touchscreen 16. Several vendors known to those of skill in the art produce a touchscreen suitable for use with a gaming machine. Additionally, touchscreen technology which uses infrared or other optical sensing methods to detect screen contact in lieu of pressure sensing may be employed, such as the proprietary technology developed by NextWindow Ltd. of Aukland, New Zealand.

Rear display device 18*d* includes a digital display device with a curved surface. A digital display device refers to a display device that is configured to receive and respond to a digital communication, e.g., from a processor or video card. Thus, OLED, LCD and projection type (LCD or DMD) devices are all examples of suitable digital display devices. E Ink Corporation of Cambridge Mass. produces electronic ink displays that are suitable for use in rear display device 18*d*. Microscale container display devices, such as those produced SiPix of Fremont Calif., are also suitable for use in rear display device 18*d*. Several other suitable digital display devices are provided below.

Referring to FIGS. 2A and 2B, window portions 15 of proximate display device 18*a* are significantly transparent or translucent. The window portions 15 may be any suitable shape and size and are not limited to the sizes and arrangements shown. Pixilated element panels on many non-emissive displays such as LCD panels are largely invisible to a viewer. More specifically, many display technologies, such as electroluminescent displays and LCD panels, include portions that are transparent when no video images are displayed thereon. For example, an electroluminescent display may utilize non-organic phosphors that are both transparent and emissive (such as a tOLED), and addressed through transparent row and column drivers. Pixilated element panels on LCD panels are also available in significantly transparent or translucent designs that permit a person to see through the pixilated panels when not locally displaying an image.

If used, corresponding portions of touchscreen 16 and light valve 18*e* along the lines of sight for portions 15 are also translucent or transparent, or alternatively have the capacity to be translucent or transparent in response to control signals from a processor included in the gaming machine. When portions (or all) of the screens for touchscreen 16, display devices 18*a* and 18*b*, and light valve 18*e* are transparent or translucent, a player can simultaneously see images displayed on the display screen 18*a* (and/or 18*b*)—as well as the images displayed on the interior display devices 18*c*—by looking through the transparent portions 15 of proximate display devices.

In another embodiment, the layered displays in a gaming machine include a design or commercially available unit from Pure Depth of Redwood City, Calif. The Pure Depth technology incorporates two or more LCD displays into a physical unit, where each LCD display is separately addressable to provide separate or coordinated images between the LCDs. Many Pure Depth display systems include a high-brightened backlight, a rear image panel, such an active matrix color LCD, a diffuser, a refractor, and a front image plane; these devices are arranged to form a stack. The LCDs in these units are stacked at set distances.

The layered display devices 18 may be used in a variety of manners to output games on a gaming machine. In some cases, video data and images displayed on the display devices 18*a* and 18*c* are positioned such that the images do not overlap (that is, the images are not superimposed). In other instances, the images overlap. It should also be appreciated that the images displayed on the display screen can fade-in fade out, pulsate, move between screens, and perform other inter-screen graphics to create additional affects, if desired.

In a specific embodiment, display devices 18 display co-acting or overlapping images to a person. For example, front display device 18*a* (or 18*b*) may display paylines in transparent portions 15 that illuminate winning combinations of reels 125 disposed on display devices 18*c*.

In another specific embodiment, layered display devices 18 provide 3D effects. A gaming machine may use a combination of virtual 3D graphics on any one of the display devices—in addition to 3D graphics obtained using the different depths of the layered display devices. Virtual 3D graphics on a single screen typically involve shading, highlighting and perspective techniques that selectively position graphics in an image to create the perception of depth. These virtual 3D image techniques cause the human eye to perceive depth in an image even though there is no real depth (the images are physically displayed on a single display screen, which is relatively thin). Also, the predetermined distance, D (between display screens for the layered display devices) facilitates the creation of 3D effects having a real depth between the layered display devices. 3D presentation of graphic components may then use a combination of: a) virtual 3D graphics techniques on one or more of the multiple screens; b) the depths between the layered display devices; and c) combinations thereof. The multiple display devices may each display their own graphics and images, or cooperate to provide coordinated visual output. Objects and graphics in a game may then appear on any one or multiple of the display devices, where reels and other graphics on the proximate screen(s) block the view objects on the distal screen(s), depending on the position of the viewer relative to the screens. This provides actual perspective between the graphics objects, which represents a real-life component of 3D visualization (and not just perspective virtually created on a single screen).

In another specific embodiment, the multiple display devices output video for different games or purposes. For example, the interior display device may output a reel game, while the intermediate display device outputs a bonus game or pay table associated with the interior display, while the exterior and foremost display device provides a progressive game or is reserved for player interaction and video output with the touchscreen. Other combinations may be used.

Reel games output by the display devices may include any video game that portrays one or more reels. Typically, the gaming machines simulates ‘spinning’ of the video reels using motion graphics for the symbols on the reel strips and motion graphics for the mechanical components.

Controlling transparency of the outer one or two display devices also provides game presentation versatility on a single gaming machine. In one embodiment, an outer or intermediate display device acts as a light valve that controls whether the interior display device is visible, or what portions of the interior display device are visible. For example, window portions of the intermediate display device may be left transparent to permit viewing of a select number video reels arranged behind the light valve.

In another embodiment, the outer display device completely blocks out the interior display device, where the outermost display device is now solely visible and used for game presentation. The gaming machine now resembles a conventional gaming machine that only includes a single LCD panel. The gaming machine may then respond to digital controls to switch between a reel game, a multi-layer/multi-display game, and a simple one-panel LCD game. Other uses of the layered displays are possible and contemplated.

Gaming machine 10 uses the layered display devices 18 to show visual information on the different screens that a player can simultaneously see. Additional sample game presentations and uses of the layered display devices will now be discussed.

In another specific example, the gaming machine generates a game image on an interior display device and a flashing translucent image on a proximate display device. The game could for example, be reels or one or more wheels, and a flashing image on the proximate display could be a translucent line that indicates the payline(s) on the reels. Since some games permit multiple paylines based on the person’s wager, this permits the game to show multiple paylines responsive to the person’s actions. Alternatively, the proximate display may show a symbol or message that provides a player with helpful information such as a hint for playing the game. Notably, each of these examples allows the person to play the game while viewing the flashing image without having to change his or her line of sight or having to independently find such information from another portion of the gaming machine.

In one embodiment, the gaming machine presents different game types on the layered display devices. For example, the interior and backmost display device may output a main game with reels 125 while a proximate display device shows a bonus game or progressive game. The bonus game or progressive game may result from playing the main game. Again, this permits the player to play the game while viewing a flashing bonus image without having to change his or her line of sight or having to independently find such information from another portion of the gaming machine.

Visual information on each of the distal screens remains visible as long as there are transparent or semi-transparent portions on the proximate screens that permit a user to see through these portions. Transparent portions may be selectively designed and timely activated according to game design, and changed according to game play. For example, if a game designer wants a person to focus on a bonus game on the front screen, they can use an intermediate light valve to black out a distal reel game.

In one embodiment, the layered display devices are all-digital and permit reconfiguration in real time. This permits new or different games to be downloaded onto a gaming machine, and reconfiguration of the three display devices to present a new or different game using any combination of the display devices. Game aspects changed in this manner may include: reel symbols, the paytable, the game theme, wager denominations, glass plate video data, reel strips, etc. For a casino, or other gaming establishment, this permits a single gaming machine to offer multiple games without the need for gaming machine maintenance or replacement when a new game is desired by casino management or customer demand. On one day, the gaming machine may offer games using all the layered display devices. The next day, the same gaming machine may offer a game that only uses an outer LCD panel and touchscreen, where a shutter (or other technology on front display) blocks out the back display devices. Some other subset of the layered displays may also be used. This permits dual-dynamic display device reconfiguration and/or game reconfiguration, at will, by downloading commands to the gaming machine that determine a) what game(s) is played, and b) what display device(s) is used. For example, this allows the same gaming machine to run a reel game one day and a video poker game another day that uses some subset of the display devices.

This reconfiguration of display devices used and games also enables new uses for gaming machines. Traditionally, a casino or other gaming establishment purchased a gaming machine and offered games only according to its display capabilities. If a casino purchased 250 gaming machines that only had LCD panels, and then later decided they wanted to implement reel games or other games that required more than an LCD panel, they were forced to purchase new gaming machines. Gaming machine 10, however, solves this problem for a casino. Accordingly, gaming machines as described herein permit a gaming establishment to switch the number of display devices used by a gaming machine to display a game.

One business advantage of this dual-dynamic display device reconfiguration and/or game reconfiguration is navigating gaming regulations imposed by different jurisdictions, which often change over time. First, each jurisdiction imposes its own set of rules on what games are locally permissible. Second, gaming regulators in each jurisdiction often change the local rules. This is particularly common for new gaming regulators and jurisdictions allowing casinos for the first time. The new gaming regulators may only permit class 2 games at first (e.g., bingo) and later permit class 3 games (video poker and reel games, one year later). Gaming machine 10 allows a casino in this jurisdiction to adapt, instantly, to a regulations change with a) new games and b) new display device arrangements that were already on gaming machine 10 but not previously used. Thus, when some jurisdictions limit the number and types of games that can be played, gaming machines described herein allow a casino to switch games—on the fly without significant gaming machine maintenance or downtime in the casino—when jurisdiction rules change.

Additionally, the enhanced utility and regulatory acceptance of a viable stepper simulation using video in lieu of mechanical reels permits mechanical-simulated games in new environments. Some jurisdictions do not permit the use of actual mechanical reel machines but do allow all forms of video-based gaming machines, which permits embodiments described herein to service mechanical reel customers in these jurisdictions.

One of the display devices in a layered arrangement may also output live video such as television or a movie (or parts of either). For example, the television or movie video may be output on a rear display while a game is played on a proximate display. This permits a person to watch television or a movie while playing a game at a gaming machine, without changing position or line of sight to switch between the game and live video. The live video may also be related to the game being played to enhance enjoyment of that game, e.g., a science fiction movie related to a science fiction game being played or a 1960's television show related to a 1960's television game. The video may also play commercials for the gaming establishment, such as advertisements and infomercials for businesses related to a casino or businesses that pay for the advertising opportunity. Advertisements may include those for a local restaurant, local shows, -house offers and promotions currently offered, menus for food, etc.

Figure 5A:
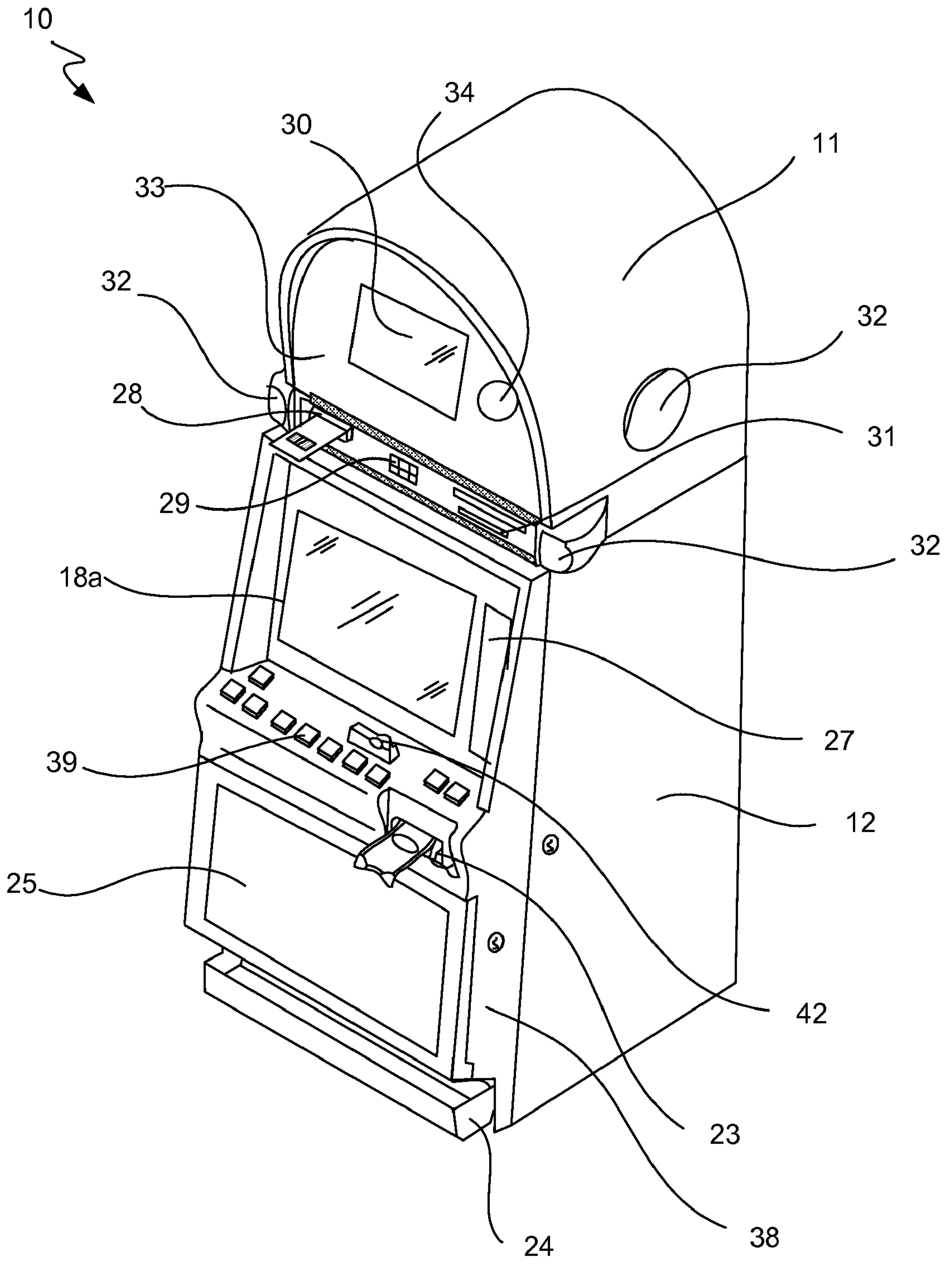
FIGS. 5A and 5B illustrate a gaming machine in accordance with a specific embodiment.
Figure 5B:
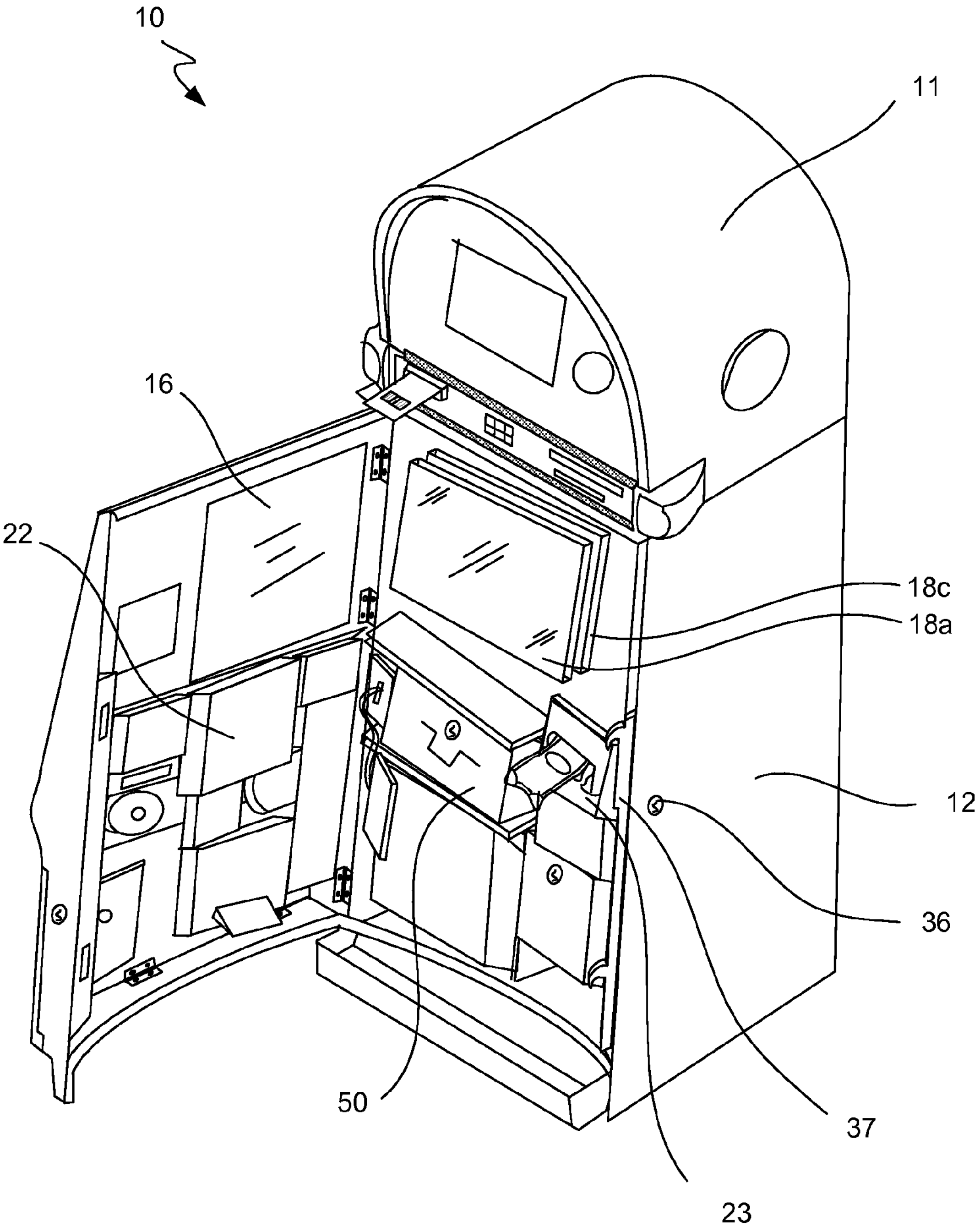

Embodiments described herein may be implemented on a wide variety of gaming machines. For example, the video reels may be output by a gaming machine as provided by IGT of Reno, Nev. Gaming machines from other manufacturers may also employ embodiments described herein. FIGS. 5A and 5B illustrate a sample gaming machine 10 in accordance with a specific embodiment. Gaming machine 10 is suitable for providing a game of chance and displaying video data that simulates a mechanical reel.

Gaming machine 10 includes a top box 11 and a main cabinet 12, which defines an interior region of the gaming machine. The cabinet includes one or more rigid materials to separate the machine interior from the external environment, is adapted to house a plurality of gaming machine components within or about the machine interior, and generally forms the outer appearance of the gaming machine. Main cabinet 12 includes a main door 38 on the front of the machine, which opens to provide access to the interior of the machine. The interior may include any number of internal compartments, e.g., for cooling and security purposes. Attached to the main door or cabinet are typically one or more player-input switches or buttons 39; one or more money or credit acceptors, such as a coin acceptor 42, and a bill or ticket scanner 23; a coin tray 24; and a belly glass 25. Viewable through main door 38 is the exterior video display monitor 18*a* and one or more information panels 27.

Top box 11, which typically rests atop of the main cabinet 12, may also contain a ticket printer 28, a keypad 29, one or more additional displays 30, a card reader 31, one or more speakers 32, a top glass 33 and a camera 34. Other components and combinations are also possible, as is the ability of the top box to contain one or more items traditionally reserved for main cabinet locations, and vice versa.

It will be readily understood that gaming machine 10 can be adapted for presenting and playing any of a number of games and gaming events, particularly games of chance involving a player wager and potential monetary payout, such as, for example, a digital slot machine game and/or any other video reel game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or gaming terminal, in that all processing may be done at a remote server, with only the external housing, displays, and pertinent inputs and outputs being available to a player. Further, it is also worth noting that the term "gaming machine" may also refer to a wide variety of gaming machines in addition to traditional free standing gaming machines. Such other gaming machines can include kiosks, set-top boxes for use with televisions in hotel rooms and elsewhere, and many server based systems that permit players to log in and play remotely, such as at a personal computer or PDA. All such gaming machines can be considered "gaming machines" for embodiments described herein.

With reference to FIG. 5B, the gaming machine of FIG. 5A is illustrated in perspective view with its main door opened. In additional to the various exterior items described above, such as top box 11, main cabinet 12 and primary video displays 18, gaming machine 10 also comprises a variety of internal components. As will be readily understood by those skilled in the art, gaming machine 10 contains a variety of locks and mechanisms, such as main door lock 36 and latch 37. Internal portions of coin acceptor 22 and bill or ticket scanner 23 can also be seen, along with the physical meters associated with these peripheral devices. Processing system 50 includes computer architecture, as will be discussed in further detail below.

When a person wishes to play a gaming machine 10, he or she provides coins, cash or a credit device to a scanner included in the gaming machine. The scanner may comprise a bill scanner or a similar device configured to read printed information on a credit device such as a paper ticket or magnetic scanner that reads information from a plastic card. The credit device may be stored in the interior of the gaming machine. During interaction with the gaming machine, the person views game information using a video display. Usually, during the course of a game, a player is required to make a number of decisions that affect the outcome of the game. The player makes these choices using a set of player-input switches. A game ends with the gaming machine providing an outcome to the person, typically using one or more of the video displays.

After the player has completed interaction with the gaming machine, the player may receive a portable credit device from the machine that includes any credit resulting from interaction with the gaming machine. By way of example, the portable credit device may be a ticket having a dollar value produced by a printer within the gaming machine. A record of the credit value of the device may be stored in a memory device provided on a gaming machine network (e.g., a memory device associated with validation terminal and/or processing system in the network). Any credit on some devices may be used for further games on other gaming machines 10. Alternatively, the player may redeem the device at a designated change booth or pay machine.

Gaming machine 10 can be used to play any primary game, bonus game, progressive or other type of game. Other wagering games can enable a player to cause different events to occur based upon how hard the player pushes on a touch screen. For example, a player could cause reels or objects to move faster by pressing harder on the exterior touch screen. In these types of games, the gaming machine can enable the player to interact in the 3D by varying the amount of pressure the player applies to a touchscreen.

As indicated above, gaming machine 10 also enables a person to view information and graphics generated on one display screen while playing a game that is generated on another display screen. Such information and graphics can include game paytables, game-related information, entertaining graphics, background, history or game theme-related information or information not related to the game, such as advertisements. The gaming machine can display this information and graphics adjacent to a game, underneath or behind a game or on top of a game. For example, a gaming machine could display paylines on a proximate display screen and also display a reel game on a distal display screen, and the paylines could fade in and fade out periodically.

A gaming machine includes one or more processors and memory that cooperate to output games and gaming interaction functions from stored memory. FIG. 6 illustrates a control configuration for use in a gaming machine in accordance with another specific embodiment.

Processor 332 is a microprocessor or microcontroller-based platform that is capable of causing a display system 18 to output video data such as symbols, cards, images of people, characters, places, and objects which function in the gaming device. Processor 332 may include a commercially available microprocessor provided by a variety of vendors known to those of skill in the art. Gaming machine 10 may also include one or more application-specific integrated circuits (ASICs) or other hardwired devices. Furthermore, although the processor 332 and memory device 334 reside on each gaming machine, it is possible to provide some or all of their functions at a central location such as a network server for communication to a playing station such as over a local area network (LAN), wide area network (WAN), Internet connection, microwave link, and the like.

Memory 334 may include one or more memory modules, flash memory or another type of conventional memory that stores executable programs that are used by the processing system to control components in a layered display system and to perform steps and methods as described herein. Memory 334 can include any suitable software and/or hardware structure for storing data, including a tape, CD-ROM, floppy disk, hard disk or any other optical or magnetic storage media. Memory 334 may also include a) random access memory (RAM) 340 for storing event data or other data generated or used during a particular game and b) read only memory (ROM) 342 for storing program code that controls functions on the gaming machine such as playing a game.

A player uses one or more input devices 338, such as a pull arm, play button, bet button or cash out button to input signals into the gaming machine. One or more of these functions could also be employed on a touchscreen. In such embodiments, the gaming machine includes a touch screen controller **16*a* that communicates with a video controller 346 or processor 332**. A player can input signals into the gaming machine by touching the appropriate locations on the touchscreen.

Processor 332 communicates with and/or controls other elements of gaming machine 10. For example, this includes providing audio data to sound card 336, which then provides audio signals to speakers 330 for audio output. Any commercially available sound card and speakers are suitable for use with gaming machine 10. Processor 332 is also connected to a currency acceptor 326 such as the coin slot or bill acceptor. Processor 332 can operate instructions that require a player to deposit a certain amount of money in order to start the game.

Although the processing system shown in FIG. 6 is one specific processing system, it is by no means the only processing system architecture on which embodiments described herein can be implemented. Regardless of the processing system configuration, it may employ one or more memories or memory modules configured to store program instructions for gaming machine network operations and operations associated with layered display systems described herein. Such memory or memories may also be configured to store player interactions, player interaction information, and other instructions related to steps described herein, instructions for one or more games played on the gaming machine, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

The processing system may offer any type of primary game, bonus round game or other game. In one embodiment, a gaming machine permits a player to play two or more games on two or more display screens at the same time or at different times. For example, a player can play two related games on two of the display screens simultaneously. In another example, once a player deposits currency to initiate the gaming device, the gaming machine allows a person to choose from one or more games to play on different display screens. In yet another example, the gaming device can include a multi-level bonus scheme that allows a player to advance to different bonus rounds that are displayed and played on different display screens.

Although the foregoing invention has been described in some detail for purposes of clarity of understanding, it will be apparent that certain changes and modifications may be practiced within the scope of the appended claims. Therefore, the present examples are to be considered as illustrative and not restrictive, and the invention is not to be limited to the details given herein, but may be modified within the scope of the appended claims.

What is claimed is:

1. A gaming machine comprising:

a cabinet defining an interior region of the gaming machine, the cabinet adapted to house a plurality of gaming machine components within or about the interior region;

a first video display device, disposed within or about the interior region, configured to output a visual image in response to a control signal and including one or more controllably transparent portions;

a second video display device, arranged relative to the first video display device such that a video reel portion of the second video display device is visible through a portion of the first video display device; and at least one processor configured to execute instructions, from memory, that a) display video data for multiple video reels on the second video display device, wherein the video data for each of the multiple video reels depicts a reel strip with multiple reel game symbols, b) permit game play of a reel game of chance that uses the multiple video reels displayed by the second video display device, and c) display video data, on the second video display device, that includes a first video data adaptation to the video data for the multiple video reels, wherein the first video data adaptation provides, in two dimensions, a simulated three dimensional visual effect associated with viewing a mechanical reel in a gaming machine, wherein the first video data adaptation includes virtual 3D graphics data causing the video displayed on the second video display to appear at least partially three dimensional and wherein the first video data adaptation includes perspective video data that outwardly bows and provides curvature at a central portion of both lateral sides of a video reel strip or a video reel displayed on a substantially planar surface, resulting in the video reel strip or the video reel having a central portion that is wider than a top portion and a bottom portion of the video reel strip or the video reel.

2. The gaming machine of claim 1 wherein a lateral width for the video reel strip at a top portion of the video reel strip is no greater than 5 percent less than a lateral width of the video reel at a central portion of the video reel.

3. The gaming machine of claim 1 wherein the first video data adaptation simulates back-lighting of a video reel.

4. The gaming machine of claim 3 wherein the back-lighting increases luminance for a central portion of the video reel.

5. The gaming machine of claim 1 wherein a visual image on the first video display device includes a set of non-transparent video bars that separate transparent video windows, where each transparent video window is configured on the first video display device such that at least one of the multiple video reels on the second video display device is visible through the non-transparent video window.

6. The gaming machine of claim 1 wherein the first video data adaptation includes a distortion simulating spatial foreshortening.

7. The gaming machine of claim 1 wherein the at least one processor is configured to execute instructions, from memory, that display video data, on the first video display device, that includes a second video data adaptation simulating a visual imperfection associated with viewing a real glass plate on a gaming machine.

8. The gaming machine of claim 7 wherein the visual imperfection includes a simulated frayed or discolored sticker.

9. The gaming machine of claim 7 wherein the visual imperfection includes one or more simulated glare lines.

10. The gaming machine of claim 1 wherein the at least one processor is further configured to execute instructions, from memory, that provide a trapezoidal shape to a reel game symbol depending on the position of the reel game symbol on the video reel strip or video reel so as to enhance a perceived sensation of curvature of the video reel strip or video reel.

11. The gaming machine of claim 10 wherein the at least one processor is configured to execute instructions, from memory, that change the shape of the reel game symbol in real time.

12. The gaming machine of claim 1 wherein the at least one processor is further configured to execute instructions, from memory, that cause a reel game symbol to fade in and fade out.

13. The gaming machine of claim 1 wherein the at least one processor is configured to execute instructions, from memory, that cause an image to move between the first video display device and the second video display device.

14. A method of providing a game of chance on a gaming machine, the method comprising:

displaying the game of chance using a first video display device and a second video display device included in the gaming machine, wherein the second video display device is arranged relative to the first video display device such that a video reel portion of the second video display device is visible through a portion of the first video display device, and wherein the game of chance includes multiple video reels displayed on the second video display device and each video reel includes multiple video symbols on a video reel strip;

during the game, simulating the movement of symbols on each video reel in the multiple video reels on the second video display device; and for one or more of the video reels in the multiple video reels, displaying a first video data adaptation to video data for one or more of the multiple video reels, wherein the first video data adaptation provides, in two dimensions, a simulated three dimensional visual effect associated with viewing a mechanical reel in a gaming machine, wherein the first video data adaptation includes virtual 3D graphics data causing the video displayed on the second video display to appear at least partially three dimensional and wherein the first video data adaptation includes perspective video data that outwardly bows and provides curvature at a central portion of both lateral sides of a video reel strip or a video reel displayed on a substantially planar surface, resulting in the video reel strip or the video reel having a central portion that is wider than a top portion and a bottom portion of the video reel strip or the video reel.

15. The method of claim 1 wherein a lateral width for the video reel strip at a top portion of the video reel strip is no greater than 5 percent less than a lateral width of the video reel at a central portion of the video reel.

16. The method of claim 14 wherein the first video data adaptation simulates back-lighting of a video reel.

17. The method of claim 16 wherein the back-lighting increases luminance for a central portion of the video reel.

18. The method of claim 14 wherein the first video data adaptation simulates fore-lighting of a video reel.

19. The method of claim 16 wherein the back-lighting decreases luminance for a central portion of the video reel.

20. The method of claim 14 wherein a visual image on the first video display device includes a set of non-transparent video bars that separate transparent video windows, where each transparent video window is configured on the each first video display device such that a line of sight passes through the video window and intersects at least one of the multiple video reels on the second video display device.

21. The gaming machine of claim 14 wherein the first video data adaptation includes a distortion simulating spatial foreshortening.

22. The gaming machine of claim 14 wherein the method further includes:

displaying video data, on the first video display device, that includes a second video data adaptation simulating a visual imperfection associated with viewing a real glass plate on a gaming machine.

23. The gaming machine of claim 22 wherein the visual imperfection includes a simulated frayed or discolored sticker.

24. Logic encoded in one or more tangible media for execution and, when executed, operable to provide a game of chance on a gaming machine, the logic including:

instructions for displaying the game of chance using a first video display device and a second video display device included in the gaming machine, wherein the second video display device is arranged relative to the first video display device such that a video reel portion of the second video display device is visible through a portion of the first video display device, and wherein the game of chance includes multiple video reels displayed on the second video display device and each video reel includes multiple video symbols on a video reel strip;

instructions for simulating the movement of symbols on each video reel in the multiple video reels on the second video display device; and instructions for displaying a video data adaptation to video data for one or more of the multiple video reels, wherein the video data adaptation provides, in two dimensions, a simulated three dimensional visual effect associated with viewing a mechanical reel in a gaming machine, wherein the video data adaptation includes virtual 3D graphics data causing the video displayed on the second video display to appear at least partially three dimensional and wherein the video data adaptation includes perspective video data that outwardly bows and provides curvature at a central portion of both lateral sides of a video reel strip or a video reel displayed on a substantially planar surface, resulting in the video reel strip or the video reel having a central portion that is wider than a top portion and a bottom portion of the video reel strip or the video reel.

25. A gaming machine comprising:

means for displaying the game of chance using a first video display device and a second video display device included in the gaming machine, wherein the second video display device is arranged relative to the first video display device such that a video reel portion of the second video display device is visible through a portion of the first video display device, and wherein the game of chance includes multiple video reels displayed on the second video display device and each video reel includes multiple video symbols on a video reel strip;

means for simulating the movement of symbols on each video reel in the multiple video reels on the second video display device; and means for displaying a video data adaptation to video data for one or more of the multiple video reels, wherein the video data adaptation provides, in two dimensions, a simulated three dimensional visual effect associated with viewing a mechanical reel in a gaming machine, wherein the video data adaptation includes virtual 3D graphics data causing the video displayed on the second video display to appear at least partially three dimensional and wherein the video data adaptation includes perspective video data that outwardly bows and provides curvature at a central portion of both lateral sides of a video reel strip or a video reel displayed on a substantially planar surface, resulting in the video reel strip or the video reel having a central portion that is wider than a top portion and a bottom portion of the video reel strip or the video reel.

* * * * *

UNITED STATES PATENT AND TRADEMARK OFFICE

CERTIFICATE OF CORRECTION

PATENT NO. : 8,357,033 B2
APPLICATION NO. : 11/858695
DATED : January 22, 2013
INVENTOR(S) : Williams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 721 days.

Signed and Sealed this
Sixteenth Day of December, 2014

Michelle K. Lee
*Deputy Director of the United States Patent and Trademark Office*